(12) United States Patent
Toyoda et al.

(10) Patent No.: US 11,614,647 B2
(45) Date of Patent: Mar. 28, 2023

(54) METHOD FOR PRODUCING IMAGE DISPLAY APPARATUS

(71) Applicant: DEXERIALS CORPORATION, Tokyo (JP)

(72) Inventors: Tomoyuki Toyoda, Tochigi (JP); Yusuke Kamata, Tochigi (JP); Yoshihisa Shinya, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/952,929

(22) Filed: Nov. 19, 2020

(65) Prior Publication Data

US 2021/0087423 A1 Mar. 25, 2021

Related U.S. Application Data

(62) Division of application No. 12/450,325, filed as application No. PCT/JP2008/057070 on Apr. 10, 2008, now Pat. No. 10,876,013.

(30) Foreign Application Priority Data

Apr. 10, 2007 (JP) ................................ 2007-102938
Jul. 17, 2007 (JP) ................................ 2007-186360
(Continued)

(51) Int. Cl.
*G02F 1/1333* (2006.01)
*C09D 133/02* (2006.01)

(52) U.S. Cl.
CPC ..... *G02F 1/133331* (2021.01); *C09D 133/02* (2013.01); *G02F 1/133308* (2013.01);
(Continued)

(58) Field of Classification Search
CPC ................ C09D 133/02; G02F 1/1333; G02F 1/133308; G02F 1/133331; G02F 1/1339;
(Continued)

(56) References Cited

U.S. PATENT DOCUMENTS 4,679,918 A    7/1987   Ace
5,073,477 A    12/1991   Kusuda et al.
(Continued)

FOREIGN PATENT DOCUMENTS

CN    1502048 A    6/2004
CN    1609943 A    4/2005
(Continued)

OTHER PUBLICATIONS

Jul. 20, 2015 Office Action issued in European Application No. 08 740 108.9.
(Continued)

*Primary Examiner* — Sophie Hon
(74) *Attorney, Agent, or Firm* — Oliff PLC

(57) ABSTRACT

Exemplary embodiments enable a high-luminance and high-contrast image to be displayed so that there are no defects resulting from deforming an image display part, the curable resin composition has a uniform thickness, and air bubbles are prevented in the curable resin composition. A method for producing an image display apparatus includes coating a curable resin composition onto a base and/or protective part, arranging the base and the protective part to face each other, and forming a cured resin layer between the base and the protective part, wherein the curable resin composition has a curing shrinkage ratio of 5% or less and includes polyurethane acrylate and isobornyl acrylate, and the cured resin layer has a storage modulus of $1\times10^7$ Pa or less at 25° C. and a light transmittance in a visible region of 90% or more, and wherein the curable resin composition coated onto the base or the protective part has a pattern with a prescribed shape.

13 Claims, 6 Drawing Sheets

(30) Foreign Application Priority Data

Jan. 11, 2008 (JP) .................. 2008-005027
Jan. 13, 2008 (JP) .................. 2008-005096

(52) U.S. Cl.
CPC .... C08L 2312/06 (2013.01); C09K 2323/057 (2020.08); G02F 1/1333 (2013.01); G02F 2201/50 (2013.01); G02F 2202/023 (2013.01); G02F 2202/28 (2013.01)

(58) Field of Classification Search
CPC ............... G02F 1/161; G02F 2201/50; G02F 2202/023; G02F 2202/28; C08L 2312/06; C09K 2323/057
See application file for complete search history.

(56) References Cited

U.S. PATENT DOCUMENTS

| | | | |
|---|---|---|---|
| 5,126,620 A | 6/1992 | Haraga et al. | |
| 5,557,436 A | 9/1996 | Blose et al. | |
| 5,679,722 A * | 10/1997 | Tamura | C08K 3/013 522/170 |
| 5,926,248 A | 7/1999 | Tucker | |
| 5,976,297 A | 11/1999 | Oka et al. | |
| 6,204,896 B1 | 3/2001 | Matsuhira et al. | |
| 6,218,446 B1 | 4/2001 | Arnold et al. | |
| 6,287,745 B1 | 9/2001 | Yamamura et al. | |
| 6,383,558 B1 | 5/2002 | Fujiwara et al. | |
| 6,414,781 B1 | 7/2002 | Saitoh | |
| 6,458,467 B1 * | 10/2002 | Mizuno | C09J 7/255 428/355 N |
| 6,461,709 B1 | 10/2002 | Janssen et al. | |
| 6,654,083 B1 | 11/2003 | Toda et al. | |
| 6,673,850 B1 | 1/2004 | Yamato et al. | |
| 6,950,236 B2 | 9/2005 | Hokazono et al. | |
| 7,382,422 B2 | 6/2008 | Niiyama et al. | |
| 7,499,130 B2 | 3/2009 | Tsai et al. | |
| 7,830,595 B2 | 11/2010 | Hinata et al. | |
| 7,910,033 B2 | 3/2011 | Kamata et al. | |
| 7,927,533 B2 | 4/2011 | Kamiya et al. | |
| 7,982,826 B2 | 7/2011 | Hirakata et al. | |
| 8,773,624 B2 | 7/2014 | Shinya et al. | |
| 8,859,633 B2 | 10/2014 | Oshima et al. | |
| 9,423,638 B2 | 8/2016 | Shinya et al. | |
| 9,885,900 B2 | 2/2018 | Shinya et al. | |
| 10,216,026 B2 | 2/2019 | Shinya et al. | |
| 10,684,498 B2 | 6/2020 | Shinya et al. | |
| 10,725,329 B2 | 7/2020 | Shinya et al. | |
| 11,237,423 B2 | 2/2022 | Shinya et al. | |
| 2001/0003031 A1 * | 6/2001 | Tamura | G03F 7/027 430/269 |
| 2001/0039326 A1 | 11/2001 | Misumi et al. | |
| 2002/0018163 A1 | 2/2002 | Yamamoto et al. | |
| 2002/0048717 A1 | 4/2002 | Yamamura et al. | |
| 2002/0118323 A1 | 8/2002 | Itou et al. | |
| 2002/0131141 A1 | 9/2002 | Saitoh | |
| 2002/0154254 A1 | 10/2002 | Tasaki et al. | |
| 2002/0191287 A1 | 12/2002 | Miyazawa et al. | |
| 2003/0006704 A1 | 1/2003 | Morimoto et al. | |
| 2003/0069323 A1 | 4/2003 | Varlemann et al. | |
| 2003/0087054 A1 | 5/2003 | Janssen et al. | |
| 2003/0118922 A1 | 6/2003 | Hayashi et al. | |
| 2003/0137630 A1 | 7/2003 | Niiya | |
| 2003/0199601 A1 | 10/2003 | Chang et al. | |
| 2004/0180148 A1 | 9/2004 | Hieda et al. | |
| 2004/0192804 A1 | 9/2004 | Kura et al. | |
| 2005/0083465 A1 | 4/2005 | Niiyama et al. | |
| 2005/0126697 A1 | 6/2005 | Kuczynski | |
| 2005/0172891 A1 | 8/2005 | Suzuki et al. | |
| 2005/0190335 A1 | 9/2005 | Maruyama et al. | |
| 2005/0249683 A1 | 11/2005 | L'Alloret | |
| 2005/0249932 A1 | 11/2005 | Wang et al. | |
| 2006/0062938 A1 | 3/2006 | Takeko et al. | |
| 2006/0108050 A1 | 5/2006 | Satake et al. | |
| 2006/0110549 A1 | 5/2006 | Wang et al. | |
| 2006/0128856 A1 | 6/2006 | Takahashi et al. | |
| 2006/0158602 A1 | 7/2006 | Toyoda | |
| 2006/0159867 A1 | 7/2006 | O'Donnell | |
| 2006/0222809 A1 | 10/2006 | Yamada et al. | |
| 2006/0229376 A1 | 10/2006 | Hayashi et al. | |
| 2006/0234074 A1 | 10/2006 | Yun et al. | |
| 2006/0235101 A1 | 10/2006 | Messe | |
| 2006/0271771 A1 | 11/2006 | Cartony et al. | |
| 2006/0272771 A1 | 12/2006 | Suzuki et al. | |
| 2006/0272774 A1 | 12/2006 | Maehara et al. | |
| 2006/0279923 A1 | 12/2006 | Kim et al. | |
| 2006/0292378 A1 | 12/2006 | Mgaya et al. | |
| 2007/0046874 A1 | 3/2007 | Adachi et al. | |
| 2007/0065091 A1 | 3/2007 | Hinata et al. | |
| 2007/0133225 A1 | 6/2007 | Sakai | |
| 2007/0141244 A1 | 6/2007 | Bell et al. | |
| 2007/0202933 A1 | 8/2007 | Tolbert et al. | |
| 2007/0222911 A1 | 9/2007 | Murase | |
| 2007/0285602 A1 | 12/2007 | Takeda et al. | |
| 2008/0002093 A1 | 1/2008 | Kim | |
| 2008/0153377 A1 * | 6/2008 | Kobayashi | G02F 1/133308 445/24 |
| 2009/0128767 A1 | 5/2009 | Suezaki et al. | |
| 2009/0162645 A1 | 6/2009 | Matsuhira | |
| 2009/0283211 A1 | 11/2009 | Matsuhira | |
| 2009/0296033 A1 * | 12/2009 | Shinya | G02F 1/133308 349/122 |
| 2009/0310057 A1 | 12/2009 | Kang et al. | |
| 2009/0322983 A1 | 12/2009 | Hashino | |
| 2010/0097552 A1 | 4/2010 | Shinya et al. | |
| 2010/0097746 A1 | 4/2010 | Toyoda et al. | |
| 2010/0294344 A1 | 11/2010 | Huang | |
| 2011/0069384 A1 | 3/2011 | Kodama et al. | |
| 2011/0265934 A1 | 11/2011 | Oshima et al. | |

FOREIGN PATENT DOCUMENTS

| | | |
|---|---|---|
| CN | 1661447 A | 8/2005 |
| CN | 1788041 A | 6/2006 |
| CN | 1918515 A | 2/2007 |
| CN | 1936663 A | 3/2007 |
| CN | 101681571 B | 3/2013 |
| EP | 0 789 295 A1 | 8/1997 |
| EP | 1 261 011 A2 | 11/2002 |
| EP | 1 283 106 A1 | 2/2003 |
| EP | 1 634 910 A1 | 3/2006 |
| EP | 1 739 473 A2 | 1/2007 |
| EP | 1 973 089 A1 | 9/2008 |
| EP | 2 051 227 A1 | 4/2009 |
| EP | 2 133 855 A1 | 12/2009 |
| GN | 1152330 A | 6/1997 |
| JP | H60-079388 A | 5/1985 |
| JP | H02-165188 A | 6/1990 |
| JP | H03-204616 A | 9/1991 |
| JP | 06-088963 A | 3/1994 |
| JP | H06-75701 A | 3/1994 |
| JP | H06-299126 A | 10/1994 |
| JP | H06-337411 A | 12/1994 |
| JP | H07-13173 A | 1/1995 |
| JP | H07-64282 A | 3/1995 |
| JP | H07-114010 A | 5/1995 |
| JP | H08-122759 A | 5/1996 |
| JP | H08-160407 A | 6/1996 |
| JP | H08-211353 A | 8/1996 |
| JP | H08-220554 A | 8/1996 |
| JP | H08-328023 A | 12/1996 |
| JP | H09-087593 A | 3/1997 |
| JP | H09-259770 A | 10/1997 |
| JP | H09-274536 A | 10/1997 |
| JP | H09-318932 A | 12/1997 |
| JP | H10-81956 A | 3/1998 |
| JP | H10-081956 A | 3/1998 |
| JP | H10-83247 A | 3/1998 |
| JP | H10-95967 A | 4/1998 |
| JP | H10-168424 A | 6/1998 |
| JP | H10-293314 A | 11/1998 |
| JP | H11-181385 A | 7/1999 |

(56) References Cited

FOREIGN PATENT DOCUMENTS

| | | |
|---|---|---|
| JP | 2000-026555 A | 1/2000 |
| JP | 2000-073025 A | 3/2000 |
| JP | 2000-111908 A | 4/2000 |
| JP | 2000-219868 A | 8/2000 |
| JP | 2000-258780 A | 9/2000 |
| JP | 2000-267118 A | 9/2000 |
| JP | 2000-269475 A | 9/2000 |
| JP | 2000-284700 A | 10/2000 |
| JP | 2001-026758 A | 1/2001 |
| JP | 2001026759 A | 1/2001 |
| JP | 2001-037868 A | 2/2001 |
| JP | 2001-141907 A | 5/2001 |
| JP | 2001-290005 A | 10/2001 |
| JP | 3220403 B2 | 10/2001 |
| JP | 2002-019013 A | 1/2002 |
| JP | 2002-040208 A | 2/2002 |
| JP | 2002-052552 A | 2/2002 |
| JP | 2002-092957 A | 3/2002 |
| JP | 2002-108238 A | 4/2002 |
| JP | 2002-258268 A | 9/2002 |
| JP | 2002-528298 A | 9/2002 |
| JP | 3327423 B2 | 9/2002 |
| JP | 2002-309199 A | 10/2002 |
| JP | 2002309199 A * | 10/2002 ....... G02F 1/133526 |
| JP | 2002-323861 A | 11/2002 |
| JP | 2002-341317 A | 11/2002 |
| JP | 2002-341776 A | 11/2002 |
| JP | 2002-348150 A | 12/2002 |
| JP | 2002-543545 A | 12/2002 |
| JP | 2003-003150 A | 1/2003 |
| JP | 2003-029644 A | 1/2003 |
| JP | 2003-096425 A | 4/2003 |
| JP | 2003-150065 A | 5/2003 |
| JP | 2003-207790 A | 7/2003 |
| JP | 2003-295780 A | 10/2003 |
| JP | 2004-009665 A | 1/2004 |
| JP | 2004-029711 A | 1/2004 |
| JP | 2004-061925 A | 2/2004 |
| JP | 2004-069925 | 3/2004 |
| JP | 2004-077887 A | 3/2004 |
| JP | 2004-115757 A | 4/2004 |
| JP | 2004-117545 A | 4/2004 |
| JP | 2004-169023 A | 6/2004 |
| JP | 2004-170907 A | 6/2004 |
| JP | 2004-212521 A | 7/2004 |
| JP | 2004-224855 A | 8/2004 |
| JP | 2004-256595 A | 9/2004 |
| JP | 2004-271935 A | 9/2004 |
| JP | 2004-272059 A | 9/2004 |
| JP | 2004271935 A * | 9/2004 ............ B32B 23/08 |
| JP | 2004-279946 A | 10/2004 |
| JP | 2004-325788 | 11/2004 |
| JP | 2004-325788 A | 11/2004 |
| JP | 2004-359769 A | 12/2004 |
| JP | 2004359769 A * | 12/2004 |
| JP | 2005-023315 A | 1/2005 |
| JP | 2005-055641 A | 3/2005 |
| JP | 2005-076017 A | 3/2005 |
| JP | 2005-154581 A | 6/2005 |
| JP | 2005-179481 A | 7/2005 |
| JP | 2005-225127 A | 8/2005 |
| JP | 2005-234129 A | 9/2005 |
| JP | 2005-283749 A | 10/2005 |
| JP | 2005-314687 A | 11/2005 |
| JP | 2005-315901 A | 11/2005 |
| JP | 2005314687 A * | 11/2005 |
| JP | 2006-011212 A | 1/2006 |
| JP | 2006-053425 A | 2/2006 |
| JP | 2006-053531 A | 2/2006 |
| JP | 2006-058753 A | 3/2006 |
| JP | 2006-106503 A | 4/2006 |
| JP | 2006-113435 A | 4/2006 |
| JP | 2006-129678 A | 5/2006 |
| JP | 2006-137795 A | 6/2006 |
| JP | 2006-150755 A | 6/2006 |
| JP | 2006-154758 A | 6/2006 |
| JP | 2006-159412 A | 6/2006 |
| JP | 2006-189715 A | 7/2006 |
| JP | 2006-193730 A | 7/2006 |
| JP | 2006189715 A * | 7/2006 |
| JP | 2006-221187 A | 8/2006 |
| JP | 2006-267502 A | 10/2006 |
| JP | 2006-276105 A | 10/2006 |
| JP | 2006-277828 A | 10/2006 |
| JP | 2006-282911 A | 10/2006 |
| JP | 2006-292993 A | 10/2006 |
| JP | 2006276105 A * | 10/2006 |
| JP | 2006-298964 A | 11/2006 |
| JP | 2006-308866 A | 11/2006 |
| JP | 2006-342222 A | 12/2006 |
| JP | 2006-349736 A | 12/2006 |
| JP | 2007-009115 A | 1/2007 |
| JP | 2007-010769 A | 1/2007 |
| JP | 2007-023147 A | 2/2007 |
| JP | 2007-041534 A | 2/2007 |
| JP | 2007-047621 A | 2/2007 |
| JP | 200741534 A | 2/2007 |
| JP | 2007041534 A * | 2/2007 ....... G02F 1/133502 |
| JP | 2007-077321 A | 3/2007 |
| JP | 200777321 A | 3/2007 |
| JP | 2007-086290 A | 4/2007 |
| JP | 2007-102251 A | 4/2007 |
| JP | 2007-108592 A | 4/2007 |
| JP | 2007-114737 A | 5/2007 |
| JP | 2007-140220 A | 6/2007 |
| JP | 2007-156066 A | 6/2007 |
| JP | 2007-178758 A | 7/2007 |
| JP | 2007-249038 A | 9/2007 |
| JP | 2007-298667 A | 11/2007 |
| JP | 2007293324 A | 11/2007 |
| JP | 2008019402 A | 1/2008 |
| JP | 2008-507617 A | 3/2008 |
| JP | 2008-129159 A | 6/2008 |
| JP | 2009075490 | 4/2009 |
| JP | 2009-274536 A | 11/2009 |
| JP | 2015-163991 A | 9/2015 |
| JP | 2015-187742 A | 10/2015 |
| KR | 2002-0030852 A | 4/2002 |
| KR | 10-2005-0067162 A | 6/2005 |
| KR | 2005-0067162 A | 6/2005 |
| KR | 10-2007-033920 A | 3/2007 |
| KR | 2007-0033920 A | 3/2007 |
| TW | 482913 B | 4/2002 |
| TW | 567338 B | 12/2003 |
| TW | 2004-22708 A | 11/2004 |
| TW | 2007-04704 A | 2/2007 |
| TW | 2007-10155 A | 3/2007 |
| TW | 200903084 A | 1/2009 |
| TW | I395011 B | 5/2013 |
| WO | 00/65409 A2 | 11/2000 |
| WO | 01/87595 A1 | 11/2001 |
| WO | 2006/011461 A1 | 2/2006 |
| WO | 2006011461 | 2/2006 |
| WO | 2006/049296 A1 | 5/2006 |
| WO | 2006/100788 A1 | 9/2006 |
| WO | 2006/121174 A1 | 11/2006 |
| WO | WO-2006121174 A1 * | 11/2006 ................ C08F 2/50 |
| WO | 2006/129665 A1 | 12/2006 |
| WO | 2006/129678 A1 | 12/2006 |
| WO | 2007/063751 A1 | 6/2007 |
| WO | 2007/066590 A1 | 6/2007 |
| WO | 2008/007800 A1 | 1/2008 |
| WO | WO-2008007800 A1 * | 1/2008 ............ C08F 290/06 |

OTHER PUBLICATIONS

Oct. 12, 2015 Office Action issued in European Application No. 08 740 127.9.

Oct. 12, 2015 Office Action issued in European Application No. 08 740 099.0.

Oct. 5, 2015 Office Action issued in European Application No. 08778217.3.

(56) References Cited

OTHER PUBLICATIONS

Oct. 6, 2015 Office Action issued in European Application No. 11 009 604.7.
Dec. 5, 2016 Extended European Search Report issued in European Patent Application No. 16001361.1.
Feb. 14, 2017 Office Action Issued in U.S. Appl. No. 14/859,678.
May 11, 2017 Summons to attend oral proceedings issued in European Patent Application No. 11009604.7.
Jun. 2, 2017 Office Action issued in European Patent Application No. 08740108.9.
May 18, 2021 Office Action issued in Japanese Patent Application No. 2018-223551.
May 19, 2021 Extended European Search Report issued in European Patent Application No. 20216920.7.
Mar. 12, 2021 Office Action issused in Korean Patent Application No. 10-2020-7033926.
May 27, 2021 Office Action Issued in U.S. Appl. No. 16/909,943.
Mar. 30, 2012 Office Action issued U.S. Appl. No. 12/452,329.
Jul. 18, 2012 Extended European Search Report issued in European Patent Application No. 11009604.7.
Jun. 30, 2010 European Search Report issued in European Patent Application No. 08 79 1186.3.
Jan. 17, 2010 Written Opinion of the International Search Authority issued in International Application No. PCT/JP2008/062791.
Jan. 14, 2009 Written Opinion of the International Searching Authority issued in International Application No. PCT/JP2007/064120.
U.S. Appl. No. 12/452,329, filed Dec. 24, 2009 in the name of Toyoda et al.
Aug. 19, 2008 International Search Report received in International Application No. PCT/JP2008/062866.
Jun. 22, 2010 European Search Report issued in European Patent Application No. 08778217.3.
Jan. 25, 2021 Patent Office Communication issued in European Patent Application No. 18 210 664.1.
U.S. Appl. No. 17/552,851, filed Dec. 16, 2021 in the name of Shinya et al.
U.S. Appl. No. 17/199,913, filed Mar. 12, 2021 in the name of Shinya et al.
Mar. 26, 2015 Office Action issued in U.S. Appl. No. 12/308,858.
Nov. 17, 2015 Office Action issued in U.S. Appl. No. 12/308,858.
Sep. 13, 2016 Office Action issued in U.S. Appl. No. 14/331,660.
Nov. 21, 2012 Submission of Publications and the Like, issued in Japanese Patent Application No. 2008-100891.
Nov. 6, 2013 Office Action issued in Japanese Patent Application No. 2008-101101.
U.S. Appl. No. 15/415,386, filed Jan. 25, 2017 in the name of Shinya et al.
Nov. 5, 2019 Office Action issued in Japanese Patent Application No. 2018-223551.
Feb. 25, 2016 Office Action issued in U.S. Appl. No. 12/450,325.
May 10, 2022 Notice of Reason(s) for Refusal issued in Japanese Patent Application No. 2021-118142.
Aug. 26, 2014 Office Action issued in U.S. Appl. No. 12/308,858.
Oct. 25, 2022 Notification of Reason(s) for Refusal issued in Japanese Patent Application No. 2021-118142.
Dec. 12, 2014 Extended European Search Report issued in European Patent Application No. 14002672.5.
Dec. 24, 2014 Office Action issued in Japanese Patent Application No. 2014-022038.
Dec. 2, 2014 Office Action issued in Chinese Application No. 201310103458.5.
Jan. 15, 2015 Submission of Publications issued in Japanese Patent Application No. 2013-215621.
Jan. 21, 2015 Submission of Publications issued in Japanese Patent Application No. 2013-215621.
Feb. 3, 2015 Office Action issued in Taiwanese Application No. 101130952.
Apr. 2, 2015 Office Action issued in Korean Patent Application No. 2015-7001682.
Oct. 28, 2014 Office Action issued in Korean Patent Application No. 2013-7020373.
Nov. 11, 2014 Office Action issued in Japanese Patent Application No. 2014-018947.
May 9, 2014 Office Action issued in Korean Patent Application No. 2014-7003818.
Mar. 28, 2014 Decision of Refusal issued in Japanese Patent Application No. 2008-101101.
Apr. 8, 2014 'Submission of Publications and the like' issued in Japanese Patent Application No. 2013-215621.
Jul. 31, 2014 Office Action issued in Taiwanese Patent Application No. 102118596.
Sep. 1, 2014 Office Action issued in Japanese Application No. 2013-215621.
Aug. 28, 2014 Office Action issued in Korean Application No. 2014-7013283.
Aug. 27, 2014 Office Action issued in Korean Application No. 2009-7021086.
Jul. 30, 2014 Office Action issued in Chinese Application No. 201110129612.7.
Jul. 23, 2014 Office Action issued in Japanese Application No. 2013-089503.
Sep. 30, 2014 Office Action issued in Korean Patent Application No. 2009-7020757.
Sep. 30, 2014 Notification of Reason(s) for Refusal issued in Japanese Patent Application No. 2013-089503.
Sep. 30, 2014 Notification of Reason(s) for Refusal issued in Japanese Patent Application No. 2012-181768.
Dec. 16, 2013 Office Action issued in Korean Patent Application No. 2009-7020498.
Sep. 29, 2014 Final Rejection issued in Korean Patent Application No. 2009-7020498.
Jul. 23, 2014 'Submission of Publications and the like' issued in Japanese Application No. 2012-181768.
Jul. 1, 2014 Office Action issued in Japanese Patent Application No. 2008-100891.
Feb. 14, 2014 Office Action issued in Korean Application No. 2009-7021086.
Jan. 2, 2014 Office Action issued in Korean Application No. 2013-7026158.
Feb. 8, 2014 Office Action issued in Chinese Application No. 200880011250.8.
Jul. 2, 2013 Office Action issued in Japanese Patent Application No. 2008-100891.
Jul. 16, 2013 Office Action issued in Japanese Patent Application No. 2012-105372.
Aug. 30, 2013 Submission of Publications and the like in Japanese Patent Application No. 2008-101101.
Nov. 8, 2013 Office Action issued in U.S Appl. No. 12/450,263.
Oct. 21, 2013 Office Action issued in Chinese Application No. 201110129612.7.
Jan. 14, 2014 Office Action issued in Japanese Application No. 2012-181768.
Feb. 12, 2014 Office Action issued in Japanese Application No. 2013-089503.
Dec. 16, 2013 Office Action issued in Korean Application No. 2009-7021093.
Nov. 12, 2013 Office Action issued in Japanese Application No. 2008-101101.
May 7, 2013 Office Action issued in Japanese Patent Application No. 2008-100879.
May 7, 2013 Office Action issued in Japanese Patent Application No. 2008-101983.
May 15, 2013 Office Action issued in U.S. Appl. No. 12/450,108.
Mar. 21, 2013 Office Action issued in Chinese Patent Application No. 200880011250.8.
May 8, 2013 "Submission of Publications and the like" issued in Japanese Patent Application No. 2008-105198.
Jul. 29, 2013 Office Action issued in U.S. Appl. No. 12/450,325.
Apr. 10, 2013 Office Action issued in Japanese Application No. 2008-101101.
Mar. 21, 2013 Office Action issued in Chinese Application No. 2200880011250.8.

(56) References Cited

OTHER PUBLICATIONS

Mar. 8, 2013 Office Action issued in Taiwanese Patent Application No. 97112939.
Apr. 9, 2013 Office Action issued in U.S. Appl. No. 12/450,263.
Feb. 20, 2013 Office Action issued in Japanese Patent Application No. 2008-098342.
May 9, 2013 Office Action issued in Chinese Patent Application No. 200880019222.0.
Jan. 21, 2010 International Preliminary Report on Patentability issued in PCT/JP2008/057024.
Mar. 22, 2010 Supplemental European Search Report issued in European Patent Application No. 08740108.9.
Aug. 6, 2011 Office Action issued in Chinese Patent Application No. 200880011250.8.
Nov. 23, 2011 Office Action issued in Chinese Patent Application No. 200880011250.8.
Sep. 11, 2009 U.S. Appl. No. 12/450,232 filed under the name of Shinya et al.
Jan. 21, 2010 Translation of International Preliminary Report on Patentability issued in International Patent Application No. PCT/JP2008/057005.
Jan. 21, 2010 International Preliminary Report on Patentability issued in International Application No. PCT/JP2008/057024.
Feb. 20, 2012 "Submission of Publications and the like" issued in Japanese Patent Application No. 2008-100891.
Feb. 20, 2012 "Submission of Publications and the like" issued in Japanese Patent Application No. 2008-101101.
Jul. 9, 2012 Office Action issued in European Patent Application No. 08 740 127.9.
Mar. 21, 2012 Office Action issued in Japanese Patent Application No. 2008-185415.
Mar. 23, 2011 Office Action issued in Japanese Application No. 2008-105198.
"Liquefied Polyisoprene Rubber LIR;" Catalog: 2002; pp. 1-7.
May 9, 2011 Submission of Publications and the like issued in Japanese Application No. 2008-105198.
Jul. 6, 2011 Submission of Publications and the like issued in Japanese Application No. 2008-098342.
Jul. 11, 2011 Submission of Publications and the like issued in Japanese Application No. 2008-105198.
May 25, 2011 Office Action issued in Chinese Application No. 200880011341.1.
Apr. 11, 2012 Office Action issued in Chinese Patent Application No. 200880011341.1.
Feb. 24, 2012 Office Action issued in Taiwanese Patent Application No. 097112938.
Jun. 7, 2010 Supplementary European Search Report issued in European Application No. 08740127.9.
Jun. 20, 2012 Office Action issued in Japanese Patent Application No. 2008-098342.
Mar. 27, 2015 Office Action issued in Taiwanese Patent Application 102112670.
May 7, 2015 Notification of Reason(s) of Refusal issued in Japanese Patent Application No. 2014-132099.
Apr. 9, 2007 Japanese Patent Application No. 2007-102251.
Jul. 14, 2006 Japanese Patent Application No. 2006-193730.
Jul. 17, 2007 Japanese Patent Application No. 2007-186360 (with partial translation).
Jan. 11, 2008 Japanese Patent Application No. 2008-005027 (with partial translation).
Apr. 9, 2007 Japanese Patent Application No. 2007-102252.
Oct. 3, 2011 Submission of Publications and the Like issued in Japanese Application No. 2008-98342 (with trans).
May 19, 2015 Office Action issued in Japanese Patent Application No. 2013-215621.
Jun. 4, 2015 Korean Office Action in Korean Patent Application No. 2015-7008267.
May 21, 2015 Office Action in Taiwanese Patent Application No. 103112478.
Jul. 13, 2015 Office Action issued in Taiwanese Patent Application No. 102112670.
Jul. 20, 2015 Office Action issued in European Patent Applicaiton No. 08 740 108.9.
Jun. 3, 2015 Office Action issued in Chinese Patent Application No. 2013-10578940.4.
Feb. 15, 2015 Office Action issued in Chinese Patent Application No. 201310056745.5.
Aug. 5, 2016 Office Action issued in Chinese Patent Application No. 201310103458.5.
Aug. 24, 2015 Office Action issued in Korean Patent Application No. 2009-7021192.
Oct. 12, 2015 Office Action issued in European Patent Application No. 08 740 099.0.
Oct. 12, 2015 Office Action issued in European Patent Application No. 08 740 127.9.
Sep. 1, 2015 Office Action issued in Taiwanese Patent Application No. 101130952.
Oct. 5, 2015 Office Action issued in European Patent Application No. 08778217.3.
Oct. 6, 2015 Office Action issued in European Patent Application No. 11009604.7.
Oct. 27, 2015 Office Action issued in Chinese Patent Application No. 201310056745.5.
Oct. 22, 2015 Office Action issued in Chinese Patent Application No. 201410025812.1.
Jan. 15, 2016 Office Action issued in connection with Chinese Patent Application No. 201310328607.8.
Jan. 20, 2016 Office Action issued in Chinese Application No. 201310578940.4.
Feb. 29, 2016 Office Action issued in Korean Patent Application No. 2015-7001682.
Mar. 1, 2016 Office Action issued in Japanese Patent Application No. 2015-104305.
Mar. 1, 2016 Office Action issued in Japanese Patent Application No. 2015-104375.
Dec. 24, 2014 Notification of Reason(s) for Refusal issued in Japanese Application No. 2014-022038.
Dec. 2, 2014 First Office Action issued in Chinese Application No. 201310103458.5.
Jan. 15, 2015 Submission of Publications and the like issued in Japanese Application No. 2013-215621.
Jan. 21, 2015 Submission of Publications and the like issued in Japanese Application No. 2013-215621.
Mar. 27, 2015 Office Action issued in Taiwainese Application No. 102112670.
Apr. 2, 2015 Office Action issued in Korean Application No. 2015-7001682.
Mar. 27, 2015 Office Action issued in Taiwainese Patent Application 102112670.
May 7, 2015 Office Action issued in Japanese Application No. 2014-132099.
Jun. 4, 2015 Office Action issued in Korean Application No. 2015-7008267.
May 19, 2015 Office Action issued in Japanese Application No. 2013-215621.
May 21, 2015 Office Action issued in Taiwanese Application No. 103112478.
Jul. 13, 2015 Office Action issued in Taiwanese Application No. 102112670.
Jun. 3, 2015 Office Action issued in Chinese Application No. 201310578940.4.
Oct. 18, 2013 Notice of Grounds for Rejection issued in Korean Application No. 2013-7020373.
Oct. 28, 2014 Notice of Final Rejection issued in Korean Application No. 2013-7020373.
Nov. 11, 2014 Notification of Reason(s) for Refusal issued in Japanese Application No. 2014-018947.
Jul. 23, 2014 Submission of Pubiications and the Like submitted in Japanese Application No. 2012-181768.
Jul. 23, 2014 Submission of Publications and the Like submitted in Japanese Application No. 2013-89503.

(56) References Cited

OTHER PUBLICATIONS

Jul. 30, 2014 Decision on Rejection issued in Chinese Application No. 201110129612.7.
Aug. 28, 2014 Notice of Grounds for Rejection issued in Korean Application No. 2014-7013283.
Sep. 9, 2014 Notification of Reasons for Refusal issued in Japanese Application No. 2013-215621.
Aug. 27, 2014 Notice of Final Rejection issued in Korean Application No. 2009-7021086.
Jul. 31, 2014 Taiwanese Office Action issued in Taiwanese Application No. 102118596.
Sep. 30, 2014 Notice of Grounds for Rejection issued in Korean Application No. 2009-7020757.
Sep. 30, 2014 Notification of Reasons for Refusal issued in Japanese Application No. 2013-089503.
Dec. 18, 2013 Notice of Grounds for Rejection issued in Korean Application No. 2009-7020498.
Sep. 29, 2014 Notice of Final Rejection issued in Korean Application No. 2009-7020498.
Sep. 30, 2014 Notification of Reasons for Refusal issued in Japanese Application No. 2012-181768.
Oct. 3, 2011 Office Action issued in Japanese Patent Application No. 2008-98342.
Oct. 21, 2011 Office Action issued in Korean Patent Application No. 2010-7000882.
Mar. 21, 2012 Japanese Office Action issued in Japanese Patent Application No. 2012-048220.
Mar. 21, 2012 Japanese Office Action issued in Japanese Patent Application No. 2008-096150.
Mar. 21, 2012 Japanese Office Action issued in JP-2008-185415.
Submission of Publications and the like issued in Japanese Patent Application No. 2008-105198 issued Jul. 11, 2011.
Submission of Publications and the like submitted in Japanese Patent Application No. 2008-105198 issued Dec. 13, 2011.
Aug. 31, 2012 Office Action issued in Korean Patent Application No. 2010-7000882.
Dec. 7, 2012 Submission of Publications and the like issued in Japanese Patent Application No. 2008-098342.
Nov. 26, 2004 Patent Grant Publication of Japanese Patent No. 3327423.
May 9, 2013 Submission of Publications and the Like issued in Japanese Patent Application No. 2008-105198.
Apr. 10, 2013 Notification of Reason(s) for Refusal issued in Japanese Patent Application No. 2008-101101.
May 15, 2013 Office Action issued in Chinese Patent Application No. 201110242574.6.
May 24, 2013 Office Action issued in Chinese Patent Application No. 200880024815.6.
Mar. 29, 2013 Office Action issued in Korean Patent Application No. 2010-7000882.
May 30, 2013 Office Action issued in Korean Patent Application No. 2012-7007367.
Feb. 20, 2013 Notification of Reason(s) for Refusal issued in Japanese Patent Application No. 2008-098342.
Mar. 15, 2016 Office Action issued In Japanese Patent Application No. 2015-112377.
Apr. 21, 2016 Office Action issued in Chinese Patent Application No. 2013-10103458.5.
Apr. 5, 2016 Office Action issued in Japanese Patent Application No. 2015-129846.
May 11, 2016 Submission of Publication and the like to Commissioner of the Patent Office in Japanese Patent Application No. 2015-161711.
May 11, 2016 Submission of Publications and the like to Commissioner of the Patent Office in Japanese Patent Application No. 2015-161711.
Jul. 15, 2016 Office Action Issued in U.S. Appl. No. 14/721,748.
Jun. 28, 2016 Office Action issued in Japanese Patent Application No. 2015-161711.
Jul. 28, 2016 Office Action issued in Chinese Application No. 201410025812.1.
Aug. 30, 2016 Office Action issued in Japanese Patent Application No. 2015-251710.
Nov. 18, 2016 Office Action issued in European Patent Application No. 08740127.9.
Dec. 29, 2016 Office Action issued in U.S. Appl. No. 14/721,748.
Dec. 5, 2016 Search Report issued in European Patent Application No. 16001361.1.
Dec. 21, 2016 Third Party Submission of Publication issued in Japanese Application No. 2015-161711.
Jan. 3, 2017 Office Action issued in Chinese Patent Application No. 201310103458.5.
Jan. 19, 2017 Office Action issued in Chinese Patent Application No. 201410025812.1.
Mar. 21, 2017 Office Action issued in Japanese Patent Application No. 2016-128495.
Mar. 21, 2017 Office Action issued in Japanese Patent Application No. 2015-161711.
Mar. 13, 2017 Notification of Reasons for Refusal issued in Japanese Application No. 2016-128495.
Mar. 15, 2017 Decision of Refusal issued in Japanese Application No. 2015-161711.
May 10, 2017 Summons to attend oral proceedings issued in European Patent Application No. 08778217.3.
May 11, 2017 Summons to Attend Oral Proceedings issued in European Application No. 11009604.7.
Jun. 2, 2017 Office Action issued in European Application No. 08 740 108.9.
Jun. 7, 2017 Notification of Reasons for Refusal issued in Japanese Application No. 2016-128496.
Jul. 5, 2017 Office Action issued in U.S. Appl. No. 12/450,325.
Aug. 22, 2017 Office Action issued in U.S. Appl. No. 14/721,748.
Aug. 22, 2017 Office Action issued in Korean Patent Application No. 10-2017-7016187.
Aug. 18, 2017 Office Action issued in Chinese Application No. 201510002749.4.
Nov. 28, 2017 Notification of Reasons for Refusal issued in Japanese Patent Application No. 2016-246431.
Dec. 29, 2017 Office Action issued in U.S. Appl. No. 14/721,748.
Mar. 20, 2018 Office Action issued in Japanese Application No. 2017-121431.
May 29, 2018 Office Action issued in Korean Application No. 10-2017-7016187.
Jun. 22, 2018 Office Action issued in U.S. Appl. No. 14/721,748.
Jul. 27, 2018 Extended European Search Report issued in European Patent Application No. 18179069.2.
Aug. 24, 2018 Notification of Reasons for Refusal issued in Japanese Patent Application No. 2016-246431.
Sep. 12, 2018 Office Action issued in Korean Patent Application No. 10-2018-7018731.
Jul. 31, 2018 Office Action issued in Chinese Application No. 201610359328.1.
Nov. 16, 2018 Office Action issued in Korean Application No. 2016-7017497.
Mar. 26. 2019 Office Action issued in Korean Patent Application No. 10-2018-7018731.
Mar. 29, 2019 Extended Search Repoert issued in European application No. 18210664.01.
Mar. 8, 2019 Office Action issued in Chinese Patent Application No. 2016/10359328.1.
Jul. 1, 2019 Office Action issued in Korean Patent Application No. 10-2016-7017497.
Oct. 2, 2019 Office Action issued in U.S. Appl. No. 16/216,525.
Sep. 16, 2019 Office Action issued in Chinese Patent Application No. 201610359328.1.
Nov. 11, 2019 Notification of Reasons for Refusal issued in Japanese Patent Application No. 2018-223551.
Nov. 6, 2019 European Summons issued in European Patent Application No. 16001361.1.
Feb. 18, 2020 Office Action issued in Japanese Patent Application No. 2019-104424.

(56) References Cited

OTHER PUBLICATIONS

Aug. 19, 2020 Notice of Allowance Issued in U.S. Appl. No. 12/450,325.
Sep. 3, 2020 Office Action issued in Japanese Patent Application No. 2018-223551.
Oct. 13, 2020 Decision of Refusal issued in Japanese Patent Application No. 2019-104424.
Dec. 12, 2014 European Search Report issued in European Application No. 14002672.5.
Nov. 16, 2012 Submission of Publications and the like issued in Japanese Application No. 2008-100891.
Jul. 2, 2013 Notification of Reason(s) for Refusal issued in Japanese Patent Application No. 2008-100891.
Jul. 16, 2013 Notification of Reason(s) for Refusal issued in Japanese Patent Application No. 2012-105372.
Dec. 26, 2012 Notification of Reason(s) for Refusal issued in Japanese Application No. 2008-105198.
Dec. 26, 2012 Notification of Reason(s) for Refusal issued in Japanese Application No. 2012-105372.
Nov. 30, 2012 Office Action issued in Chinese Patent Application No. 200880024815.6.
Sep. 20, 2012 Office Action issued in Taiwanese Patent Application No. 097127147.
Jul. 4, 2012 Trial Decision of Japanese Patent Application No. 11-38529 (Dissatisfaction No. 2009-14917).
Oct. 22, 2012 Submission of Publications and the like filed in Japanese Patent Application No. 2008-98342.
May 13, 2008 Notification of Reasons for Refusal for Japanese Patent Application No. 10-240922.
Oct. 24, 2012 Submission of Publications and the like filed in Japanese Patent Application No. 2008-105198.
Jul. 13, 2012 Korean Office Action issued n Korean Patent Application No. 2012-7007367.
Jul. 11, 2011 Submission of Publications and the like issued in Japanese Patent Application No. 2008-105198.
Dec. 13, 2011 Submission of Publications and the like submitted in Japanese Patent Application No. 2008-105198.
Dec. 30, 2011 Submission of Publications and the like submitted in Japanese Patent Application No. 2008-101101.
Dec. 30, 2011 Submission of Publications and the like submitted in Japanese Patent Application No. 2003-100891.
Jan. 13, 2012 Submission of Publications and the like submitted in Japanese Patent Application No. 2008-98342.
Japanese Patent Application No. 2007-186360 filed Jul. 17, 2007.
Japanese Patent Application No. 2008-005027 filed Jan. 11, 2008.
Japanese Patent Application No. 2007-102252 filed Apr. 9, 2007.
Japanese Patent Application No. 2006-193730 filed Jul. 14. 2006.
Japanese Patent Application No. 2007-102251 filed Apr. 9, 2007.
Aug. 6, 2008 Notification of Reasons for Refusal in Japanese Patent Application No. Hei 11-038529.
May 18, 2009 Decision of Refusal in Japanese Patent Application No. Hei 11-038529.
Oct. 16, 2009 Preliminary report in Japanese Patent Application No. Hei 11-038529.
Dec. 26, 2008 Notification of Reason(s) for Refusal in Japanese Patent Application No. Hei 11-038529.
The Committee of Kagaku Daijiten, eds., "Kagaku Daijiten 2," p. 375, Kyoritsu Shuppan Co., Ltd. Jul. 15, 2006.
Akira Matsumura, ed., "Daijirin," p. 449, Sanseido Publishing Co. Ltd., Nov. 3, 1988.
The Committee of Shogakukan Daijisen, eds. "Daijisen," p. 492, Shogakukan Inc., Dec. 1, 1995.
Feb. 29, 2012 Notification of Reason(s) for Refusal issued in Japanese Patent Application No. 2008-105198.
May 11, 2011 Office Action issued in Chinese Application No. 200880024844.2.
Jul. 6, 2011 Submission of Publications and the like issued in Japanese Patent Application No. 2008-98342.
May 11, 2012 Examination Report in Taiwanese Patent Application No. 97127146.
Feb. 20, 2012 Submission of Publications and the like submitted in Japanese Patent Application No. 2008-101101.
Feb. 20, 2012 Submission of Publications and the like submitted in Japanese Patent Application No. 2008-100891.
Feb. 24. 2012 Office Action issued in Taiwanese Patent Application No. 097127147.
Apr. 5, 2012 Office Action issued in Chinese Patent Application No. 200880024815.6.
Aug. 19. 2008 Office Action issued in International Patent Application No. PCT/JP2008/062866.
Jun. 20, 2012 Japanese Office Action issued in Japanese Patent Application No. 2008-098342.
Aug. 30, 2013 Submission of Publications and the Like issued in Japanese Patent Application No. 2008-101101.
Oct. 18, 2013 Office Action issued in Korean Patent Application No. 2013-7020373.
Nov. 12, 2013 Notification of Reason(s) for Refusal issued, in Japanese Patent Application No. 2008-101101.
Jan. 8, 2014 Japanese Office Action issued in Japanese Patent Application No. 2012-181768.
Jan. 12, 2010 International Preliminary Report on Patentability issued in PCT/JP2008/056996.
Jun. 25, 2010 Extended Search Report issued in European Patent Application No. 08740099.0.
Sep. 16, 2010 Office Action issued in U.S. Appl. No. 12/450,192.
Jun. 10, 2008 International Search Report issued in PCT/JP2008/056818.
Mar. 19, 2010 Extended Search Report issued in European Patent Application No. 08739924.2.
Jun. 10, 2008 International Search Report issued in PCT/JP2008/056601.
Jun. 7, 2010 Extended Search Report issued in European Patent Application No. 08740171.7.
Mar. 17, 2010 Extended Search Report issued in European Patent Application No. 08739711.3.
Jan. 30, 2012 Office Action issued in Chinese Patent Application No. 200880015927.5.
Apr. 12, 2012 Office Action issued in Chinese Patent Application No. 200880019222.0.
Jul. 11, 2012 Office Action issued in European Patent Application No. 08 740 099.0.
Jul. 1, 2008 International Search Report issued in PCT/JP2008/056996.
Apr. 26, 2011 Extended Search Report issued in European Patent Application No. 11 000219.3.
Mar. 23, 2011 Office Action issued in Chinese Patent Application No. 200880019222.0.
Jul. 9, 2012 Office Action issued in European Patent Application No. 08 740 171.7.
Jul. 9, 2012 Office Action issued in European Patent Application No. 11 000 219.3.
Aug. 16, 2012 Office Action issued in Taiwanese Patent Application No. 97112940.
Sep. 6, 2012 Office Action issued in U.S. Appl. No. 12/450,263.
Oct. 9, 2012 Office Action issued in U.S. Appl. No. 12/450,108.
Oct. 22, 2012 Office Action issued in Chinese Patent Application No. 200880019222.0.
Aug. 16, 2012 Office Action issued in Taiwanese Patent Application No. 97112942.
Oct. 24, 2012 Submission of Publications and the like issued in Japanese Patent Application No. 2008-105198.
Oct. 25, 2012 Notification of Reasons for Refusal for Japanese Patent Application No. 10-240922.
Dec. 10, 2012 Submission of Publications and the Like issued in Japanese Patent Application No. 2008-098342.
Dec. 26, 2012 Notification of Reasons of Refusal issued in Japanese Patent Application No. 2012-105372.
Dec. 26, 2012 Notification of Reasons of Refusal issued in Japanese Patent Application No. 2008-105198.
Aug. 16, 2012 Office Action issued in Taiwanese Patent Application No. 097112939.
Jun. 18, 2012 Office Action issued in Chinese Patent Application No. 200880011250.8.

(56) References Cited

OTHER PUBLICATIONS

Aug. 15, 2012 Office Action issued in Japanese Patent Application No. 2008-185415.
Jul. 31, 2012 Office Action issued in European Patent Application No. 08 740 108.9.
Dec. 6, 2012 Office Action issued in Chinese Patent Application No. 201110129612.7.
Dec. 21, 2012 Office Action issued in Chinese Patent Application No. 200880011341.1.
Oct. 23, 2012 "Trial Decision" of Japanese Patent Application No. H11-038529 (Dissatisfaction No. 2009-14917).
Oct. 22, 2012 Submission of Publications and the like issued in Japanese Patent Application No. 2008-98342.
Mar. 28, 2012 Office Action issued in Japanese Patent Application No. 2008-096150.
Mar. 28, 2012 Office Action issued in Japanese Patent Application No. 2012-048220.
Mar. 7, 2012 Office Action issued in Japanese Patent Application No. 2008-105198.
Sep. 19, 2007 Written Opinion of the International Searching Authority issued in International Application No. PCT/JP2007/064120.
Jan. 13, 2012 Submission of Publications and the Like issued in Japanese Application No. 2008-98342.
Aug. 6, 2008 Office Action issued in Japanese Patent Application No. 11-038529.
Dec. 26, 2008 Office Action issued in Japanese Patent Application No. 11-038529.
May 18, 2009 Office Action issued in Japanese Patent Application No. 11-038529.
Oct. 16, 2009 Preliminary Report issued in Japanese Patent Application No. 11-038529.
"Kagaku Daijiten 2", The Committee of Kagaku Daijiten, eds., Jul. 15, 2006, pp. 375, Kyoritsu Shuppan Co., LTD.
Matsumura, ed., "Daijirin", Nov. 3, 1988, pp. 449, Sanseido Publishing Co., Ltd.
The Committee of Shogakukan Daijisen, eds., "Daijisen" Dec. 1, 1995, pp. 492. Shogakukan Inc.
Dec. 13, 2011 Submission of Publications and the Like issued in Japanese Patent Application No. 2008-105198.
Dec. 30, 2011 Submission of Publications and the Like issued in Japanese Patent Application No. 2008-101101.
Screen shot of WIPO Patentscope search of WO 2008/007800 date unknown.
Dec. 30, 2011 Submission of Publications and the Like issued in Japanese Patent Application No. 2008-100891.
Nov. 28, 2022 Office Action issued in European Patent Application No. 20216920.7.
Nov. 25, 2022 Office Action issued in U.S. Appl. No. 17/552,851.
Jan. 13, 2023 Office Action issued in Korean Patent Application No. 10-2022-7013745.

* cited by examiner

[Fig. 2]
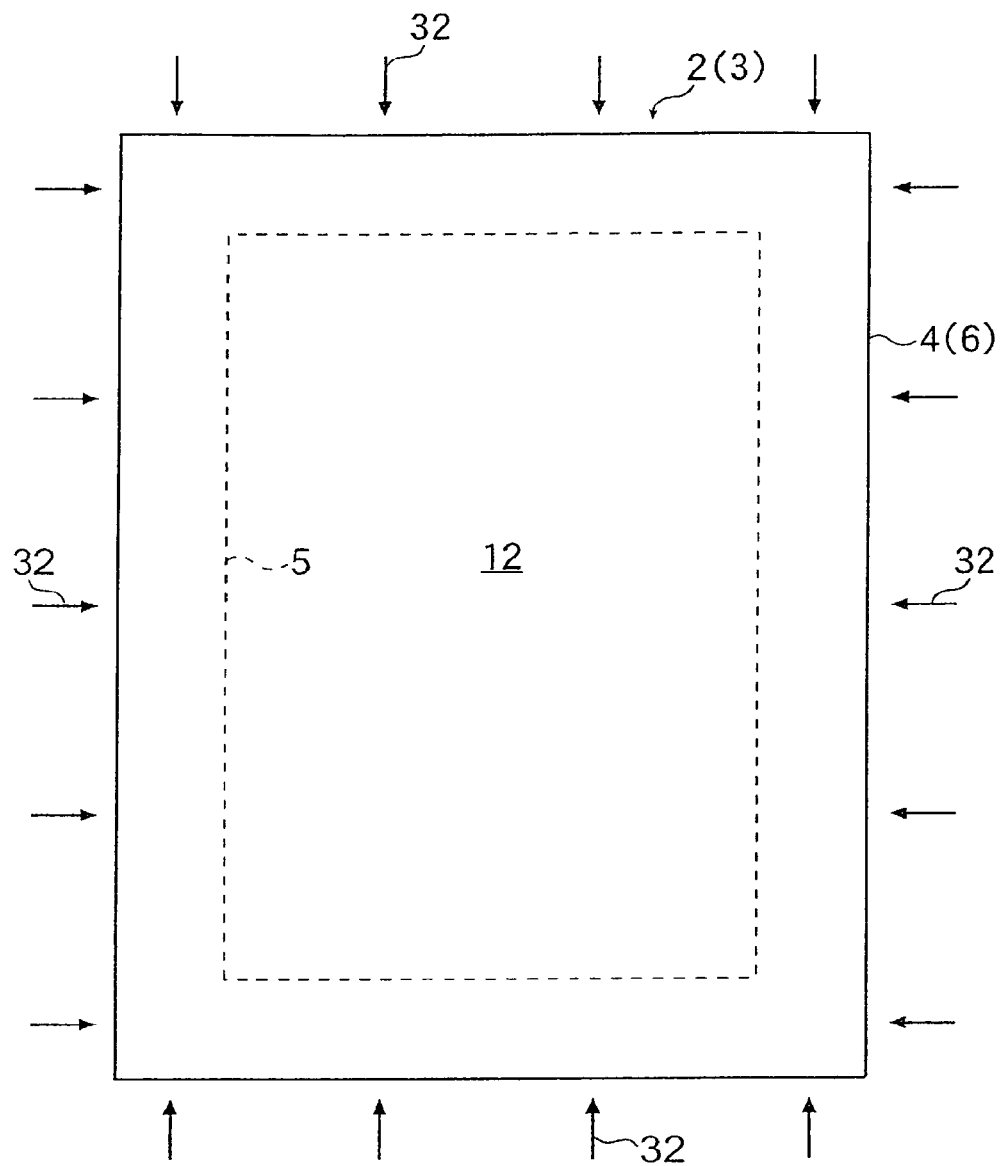

[Fig. 3]
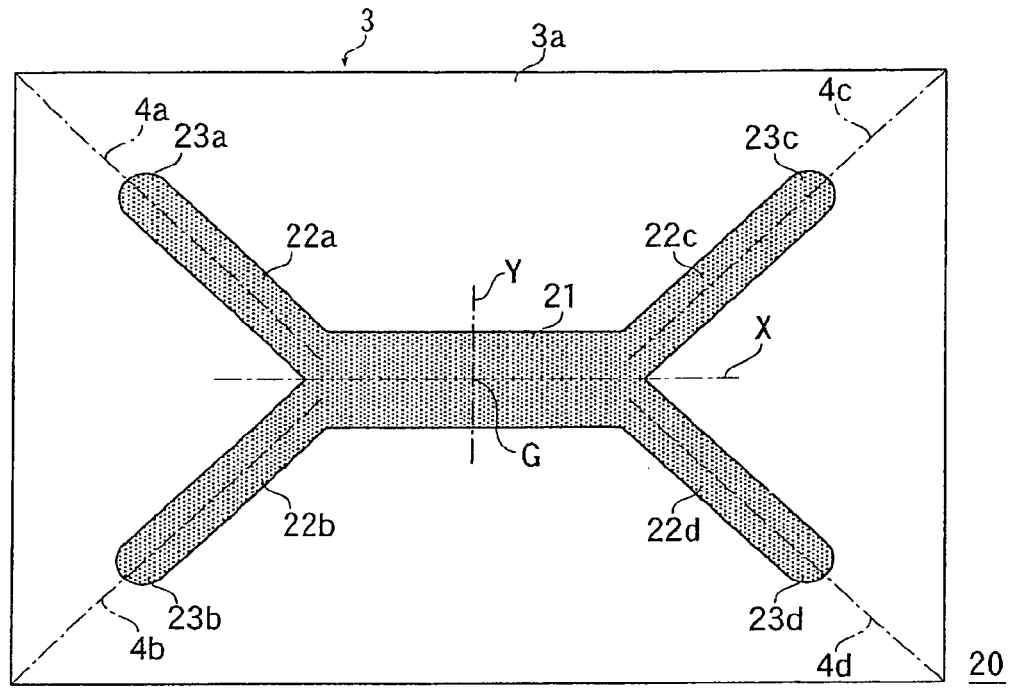
[Fig. 4]
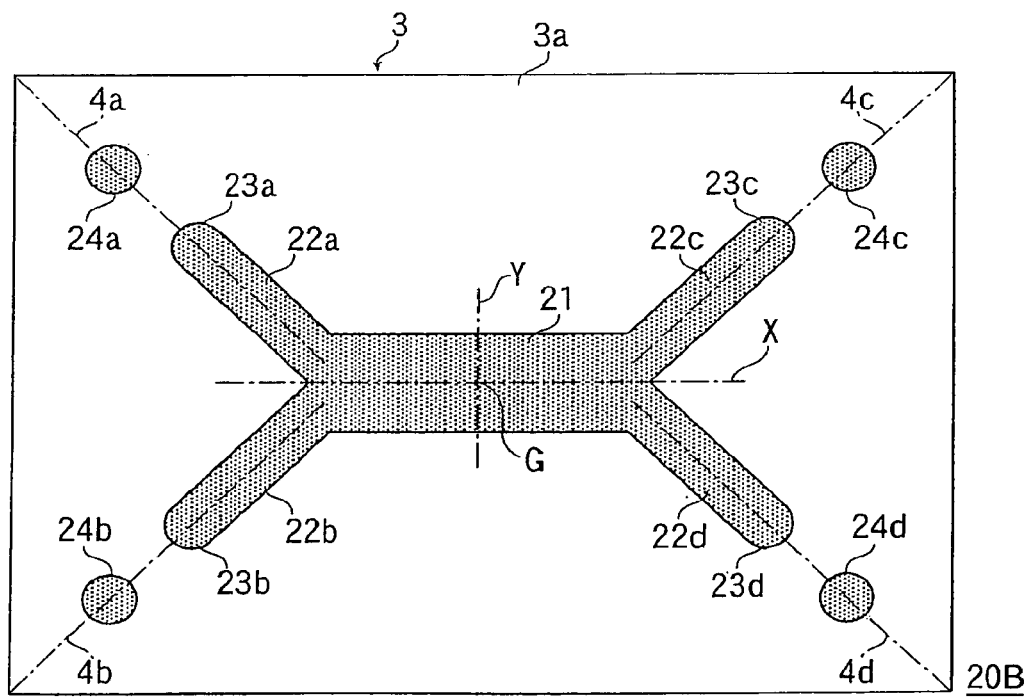

[Fig. 5]
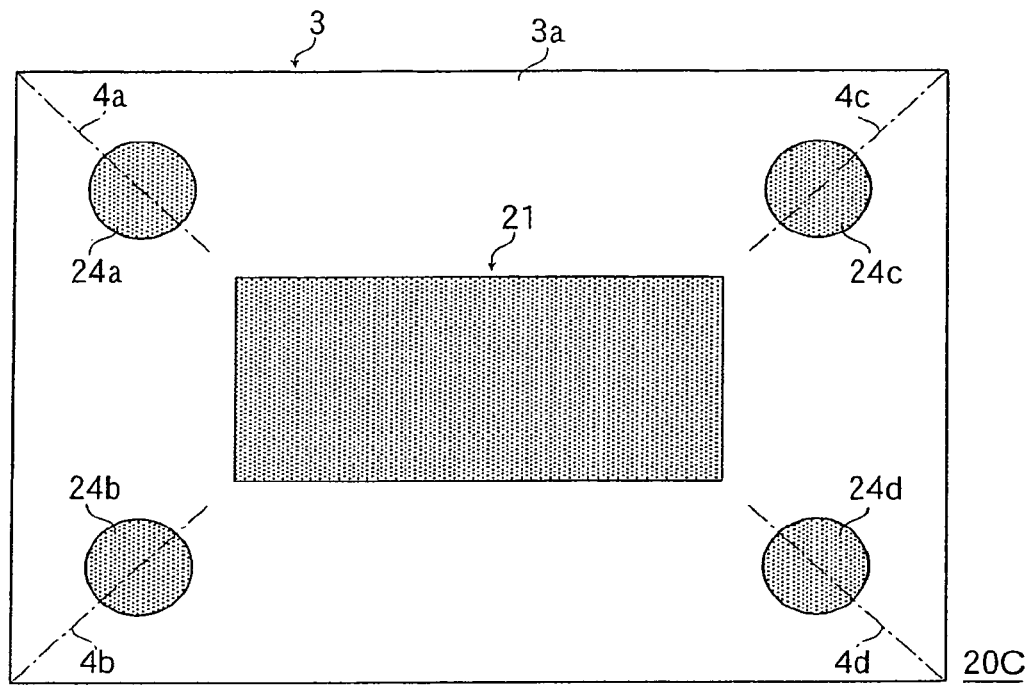
[Fig. 6]
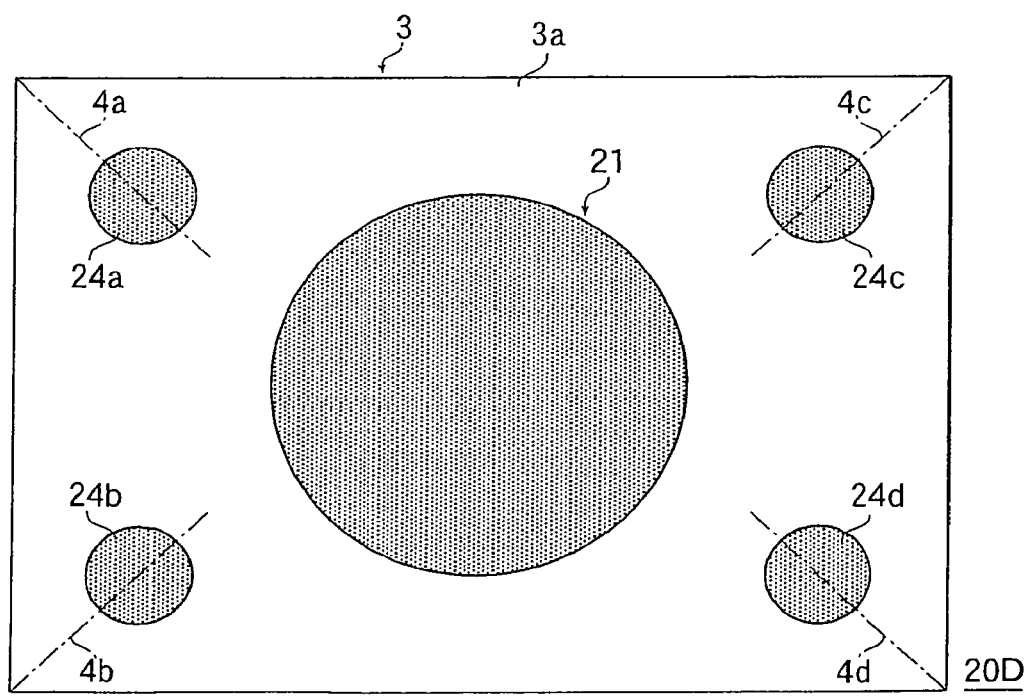

[Fig. 8]
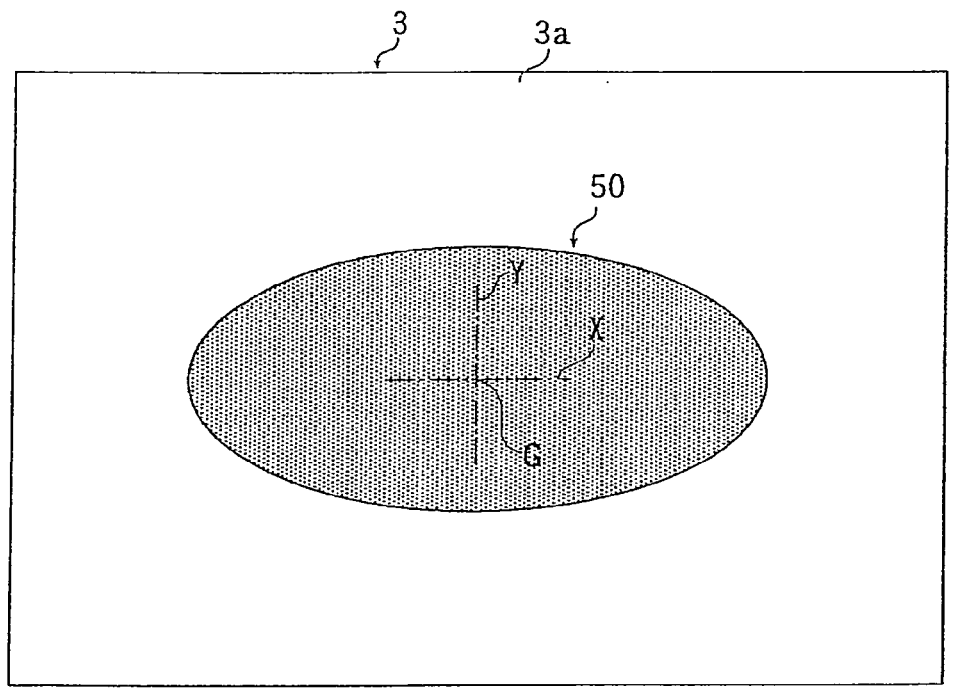
[Fig. 9]
101
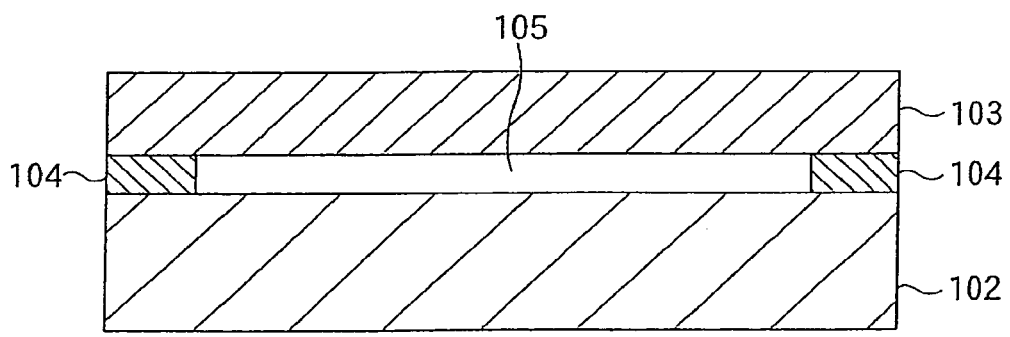
RELATED ART

METHOD FOR PRODUCING IMAGE DISPLAY APPARATUS

The present application is a continuation application of U.S. application Ser. No. 12/450,325 filed Sep. 22, 2009, which in turn is a U.S. national stage application of PCT/JP2008/057070 filed Apr. 10, 2008. Each of these prior applications is incorporated herein by reference in its entirety.

TECHNICAL FIELD

The present invention relates to a method for producing an image display apparatus, such as a liquid crystal display apparatus (LCD), used in a cellular phone, for example. In particular, the present invention relates to a method for producing an image display apparatus provided with a transparent protective part on an image display part.

BACKGROUND ART

Conventionally, as this type of image display apparatus, a liquid crystal display apparatus 101 illustrated in FIG. 9, for example, is known. This liquid crystal display apparatus 101 has a transparent protective part 103 made of, for example, glass or plastic on a liquid crystal display panel 102.

To protect the surface of the liquid crystal display panel 102 and a polarizing plate (not illustrated), a spacer 104 is arranged between the liquid crystal display panel 102 and the protective part 103 to form a gap 105 between the liquid crystal display panel 102 and the protective part 103.

However, the gap 105 between the liquid crystal display panel 102 and the protective part 103 scatters light, resulting in decreased contrast and luminance. The presence of the gap 105 also makes it difficult to produce thinner display panels.

To address these problems, it has been proposed to fill the gap between the liquid crystal display panel and the protective part with a resin (for example, Patent Document 1). However, the stress generated during the curing shrinkage of the cured resin causes an optical glass plate sandwiching the liquid crystals in the display panel to deform, resulting in image defects such as disrupted orientation of the liquid crystal material.

Furthermore, in the case of filling the gap between the liquid crystal display panel and the protective part with a resin, the resin may be coated on either the liquid crystal display panel or the protective part and then the liquid crystal display panel and the protective part may be lapped. However, when employing such a method, it is difficult to uniformly form the thickness of the resin between the liquid crystal display panel and the protective part. Moreover, there is also the problem that air bubbles can become mixed in the filled resin.

[Patent Document 1] Japanese Patent Application Laid-Open No. 2005-55641

DISCLOSURE OF THE INVENTION

Problems to be Solved by the Invention

The present invention was conceived of considering such problems in the conventional art. It is an object of the present invention to provide a technique concerning the production of a thin image display apparatus having a resin arranged between an image display part and a protective part. According to this technique, display defects resulting from deformation of the image display part are not produced, an image can be displayed with high luminance and high contrast on the display part, the thickness of a curable resin composition filled between the image display part and the protective part is uniform, and air bubbles are prevented from becoming mixed in the curable resin composition.

Means for Solving the Problems

To achieve the above-described objects, the present invention provides a method for producing an image display apparatus which includes the steps of: coating a curable resin composition onto a base having an image display part or onto a light-transmitting protective part arranged on the image display part; arranging the base and the protective part to face each other in close proximity; and forming a cured resin layer between the base and the protective part by curing the curable resin composition, wherein as the curable resin composition, a resin composition is used which has a curing shrinkage ratio of 5% or less, a cured product storage modulus of $1 \times 10^7$ Pa or less at 25° C., and a light transmittance of the cured resin layer in a visible region of 90% or more, and the curable resin composition coated onto the base or the protective part has a pattern with a prescribed shape, the curable resin composition is made to spread between the base and the protective part due to the base and the protective part being arranged facing each other in close proximity, and then the curable resin composition is cured.

In the present invention, the pattern of the curable resin composition may be formed from a center pattern positioned in a center portion of a coating face of the base or the protective part, and corner patterns which are positioned closer to the corners of the coating face than the center portion and which are continuous with or separated from the center pattern.

In the present invention, the pattern of the curable resin composition may be formed from a plurality of patterns arranged at an interval.

In the present invention, the curable resin composition may be coated onto the base or the protective part, and then the base and the protective part are arranged facing each other in close proximity in a state where the coating face faces perpendicularly down.

In the present invention, the curable resin composition may be coated on both the base and the protective part.

In the present invention, the image display part may be a liquid crystal display panel.

In the present invention, the protective part may be formed from an acrylic resin.

In the present invention, the protective part may be formed from an optical glass.

Effects of the Invention

The internal stress which builds up during curing of the resin can be approximated by the product of the after-curing storage modulus and the curing shrinkage ratio. Furthermore, according to the present invention, a curable resin composition having a curing shrinkage ratio of 5% or less and a cured product storage modulus of $1 \times 10^7$ Pa or less at 25° C. is used as the curable resin composition which is arranged between the image display part and the protective part. Thus, the effects of stress to the image display part and the protective part during curing shrinkage of the resin can be suppressed to a minimum. Therefore, hardly any distortion is produced in the image display part and the protective part. Consequently, according to the present invention, an image can be displayed which is free from display defects and which has high luminance and high contrast.

Especially, when the image display part is a liquid crystal display panel, high-quality image display can be achieved by reliably preventing image defects such as disrupted orientation of the liquid crystal material.

Furthermore, according to the present invention, the image display apparatus is stronger against shocks because a cured resin is arranged between the image display part and the protective part.

Moreover, compared with the conventional example, in which a gap is provided between the image display part and the protective part, a thinner display apparatus can be provided.

In addition, according to the present invention, concerning the arrangement of the curable resin composition between the image display part and the protective part, the curable resin composition is coated in a specific pattern onto the base having the image display part or onto the protective part, and the base and the protective part are arranged facing each other in close proximity. Consequently, the curable resin composition can be made to rapidly and completely wetly spread between the base and the protective part in a uniform thickness, and air bubbles can be reliably prevented from becoming mixed in the curable resin composition.

Furthermore, in the present invention, if the curable resin composition is coated onto the base or the protective part, and then the base and the protective part are arranged facing each other in close proximity in a state where the coating face faces perpendicularly down, it is more difficult for the surface shape of the curable resin composition to be influenced by the surface shape of the coating face of the base or the protective part. Furthermore, the coated surface of the curable resin composition pattern is smoother due the combined forces of gravity and resin surface tension. Therefore, the thickness of the curable resin composition between the base and the protective part can be made more uniform, and air bubbles can be reliably prevented from becoming mixed in this resin composition.

Especially, concerning coating the curable resin composition in a specific pattern, if the curable resin composition is formed into a center pattern positioned in a center portion of a coating face of the base or the protective part, and corner patterns which are positioned closer to the corners of the coating face than the center portion and which are continuous with or separated from the center pattern, when the curable resin composition wetly spreads due to the arrangement of the base and the protective part facing each other in close proximity, the curable resin composition can be made to rapidly spread across all regions between the base and the protective part without the curable resin composition protruding from the edges of the base and the protective part.

In this case, due to the corner patterns, the curable resin composition can be made to wetly spread along the edges of the base and the protective part.

In the present invention, if the curable resin composition pattern is separately formed both on the base and the protective part, the coating of the curable resin composition can be carried out in separate steps for the base and the protective part. This allows the production steps to be speeded up even further.

BRIEF DESCRIPTION OF THE DRAWINGS

FIG. 2 is a plan diagram illustrating the main parts of the steps for producing a display apparatus according to the same embodiment.

FIG. 3 is a diagram schematically illustrating an example of a resin composition pattern according to the present invention.

FIG. 4 is a diagram schematically illustrating another example of a resin composition pattern according to the present invention.

FIG. 5 is a diagram schematically illustrating yet another example of a resin composition pattern according to the present invention.

FIG. 6 is a diagram schematically illustrating yet another example of a resin composition pattern according to the present invention.

FIG. 8 is a diagram schematically illustrating an example of a resin composition pattern of a comparative example.

FIG. 9 is a cross-sectional diagram illustrating the main parts of an image display apparatus according to the conventional art.

DESCRIPTION OF THE REFERENCE NUMERALS

Figure 1A:
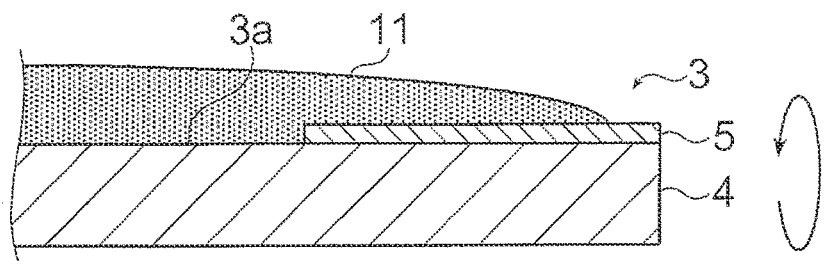
FIGS. 1(a) to 1(d) are cross-sectional process diagrams illustrating the main parts of an embodiment of the production method according to the present invention.

1 Image display apparatus
2 Base
3 Protective part
3a Coating face
4 Light-transmitting member
5 Shielding part
5a Bonding face of the shielding part
6 Frame
6a Bonding face of the frame
8 Liquid crystal display panel (image display part)
11 Curable resin composition
12 Resin composition filled portion between the shielding part and the base
13 Resin composition filled portion corresponding to the image display region
14 Cured resin layer
20, 20B, 20C, 20D . . . Resin composition pattern
21 Center pattern
22a, 22b, 22c, 22d . . . Arm portion pattern
23a, 23b, 23c, 23d . . . Arm portion pattern end
24a, 24b, 24c, 24d . . . Circular resin composition pattern
32, 33 UV-rays

BEST MODE FOR CARRYING OUT THE INVENTION

A preferred embodiment of the present invention will now be described with reference to the drawings. In the drawings, same-numbered reference numerals represent the same or a similar structural element.

FIGS. 1(a) to 1(d) are cross-sectional process diagrams illustrating the main parts of an embodiment of the method for producing an image display apparatus according to the present invention. FIG. 2 is a plan diagram illustrating the main parts of the steps for producing an image display apparatus according to the same embodiment.

Figure 1B:
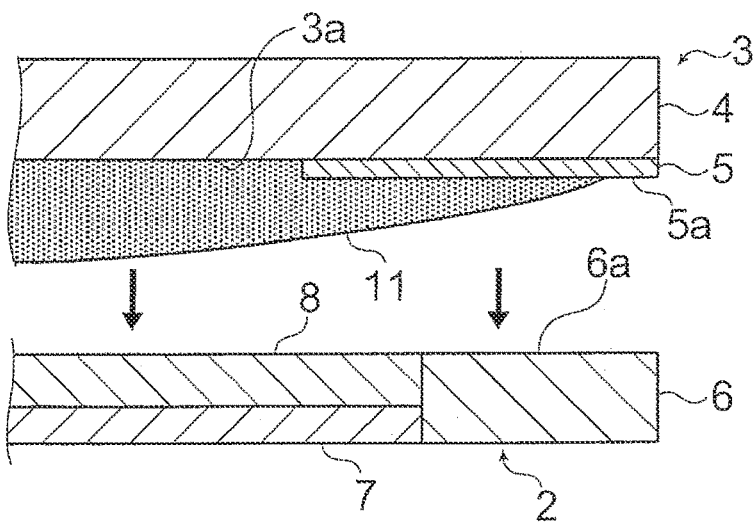
Figure 1C:
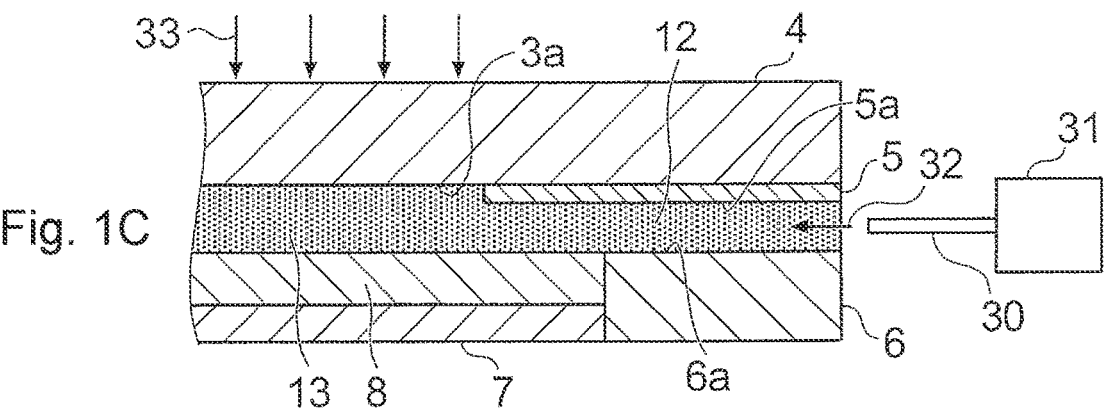
Figure 1D:
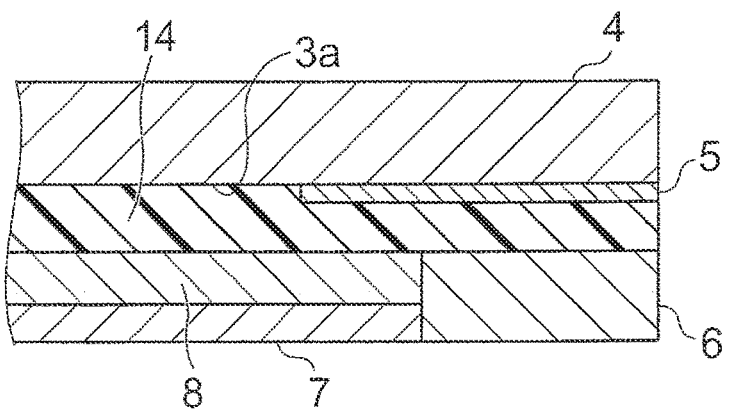

As illustrated in FIG. 1(d), in the present embodiment, a base 2, having an image display part 8 which is connected to a not-illustrated drive circuit and displays a given image, and a protective part 3 are bonded together by a cured resin layer 14.

Applications of an image display apparatus 1 are not especially limited. The image display apparatus 1 may be applied in various products, for example, in an image display apparatus such as a cellular phone, a portable game device and the like. The present invention will be described below using as an example the case of producing a liquid crystal display apparatus.

The protective part 3 is formed from a light-transmitting member 4 which is about the same size as the base 2 and is plate-like, a sheet-like, or film-like. As the light-transmitting member 4, it is preferred to use, for example, optical glass or plastic (an acrylic resin such as polymethyl methacrylate and the like). An optical layer, such as an anti-reflection film, a shielding film, a viewing angle control film and the like, may also be formed on the surface or a rear surface of the protective part 3.

A black box-shaped shielding part 5, for example, is provided on a peripheral region of the face on the base 2 side of the light-transmitting member 4 (hereinafter referred to as a "coating face 3a"). This shielding part 5 is formed in a layer form with a uniform thickness by a printing method, for example.

The flatness of the coating face 3a of the protective part 3 is not especially limited. However, from the standpoints of the ease with which the resin wetly spreads and preventing air bubbles from becoming mixed in, the coating face 3a is preferably as flat as possible.

On the other hand, the base 2 has a box-shaped frame 6, for example. A liquid crystal display panel (image display part) 8 is mounted on a region on the inner side of this frame 6. Furthermore, a backlight 7 is mounted on a position on the apparatus back side of this liquid crystal display panel 8.

In the present embodiment, a bonding face 6a of the frame 6 of the base 2 and a bonding face 5a of the shielding part 5 of the protective part 3 are parallel with each other.

In the present embodiment, concerning the bonding of the protective part 3 with the base 2, first, as illustrated in FIG. 1(a), a given amount of a photocurable resin composition, for example, is dropped onto the surface on the side on which the shielding part 5 of the protective part 3 is provided, to form various patterns of the curable resin composition 11.

The dropping amount of the curable resin composition 11 is preferably set so that the thickness of the cured resin layer 14 after bonding the protective part 3 and the base 2 together is 50 to 200 μm.

Furthermore, in the embodiment illustrated in FIG. 1, the pattern of the curable resin composition 11 is formed on the protective part 3. However, in the present invention, the pattern of the curable resin composition 11 may be coated on the base 2, or the pattern may be divided up and coated on the protective part 3 and the base 2.

From the standpoints of making the curable resin composition 11 spread in a uniform thickness between the base 2 and the protective part 3, and preventing air from becoming mixed in the curable resin composition 11, it is preferred to form the pattern of the curable resin composition 11 by coating the curable resin composition 11 so that when the base 2 and the protective part 3 are arranged facing each other in close proximity, the curable resin composition spreads across the whole of the opposing faces of the base 2 and the protective part 3. More specifically, it is preferred to form the pattern of the curable resin composition 11 from a center pattern positioned in the center portion of the coating face of the base 2 or the protective part 3, and corner patterns which are positioned closer to the corners of the coating face than this center portion and which are continuous with or separated from the center pattern. This pattern may be formed from a plurality of patterns arranged at a given interval between each other.

FIGS. 3 to 7 schematically illustrate specific examples of the resin composition pattern when the curable resin composition 11 is coated on the coating face 3a of the rectangular protective part 3.

First, a resin composition pattern 20 illustrated in FIG. 3 is formed from the curable resin composition 11 in a continuous shape in which the lower sides of roughly the letter Y are linked together.

This resin composition pattern 20 is formed symmetrical with the long side and the short side directions (XY directions) of the protective part 3. The resin composition pattern 20 is arranged on the protective part 3 so that the center of gravity of the resin composition pattern 20 matches the center of gravity (point G) of the protective part 3.

This resin composition pattern 20 is formed from a center pattern 21 positioned in the center region of the coating face 3a of the protective part 3, and corner patterns which are positioned closer to the corners of the coating face 3a than the center pattern 21.

More specifically, the center pattern 21 is formed in a belt-like pattern extending linearly in the above-described X direction. The corner patterns are formed as arm portion patterns 22a, 22b, 22c, and 22d which branch out and extend in four directions from either end of the center pattern 21.

These arm portion patterns 22a to 22d are linearly provided along reference lines 4a to 4d which extend toward each of the corners of the protective part 3 from either end of the center pattern 21. Consequently, the ends 23a to 23d of the arm portion patterns 22a to 22d are positioned close to each of the corners of the protective part 3.

The thickness of each portion of the resin composition pattern 20 does not always have to be uniform. In the present invention, the preferred thickness distribution of the resin composition pattern 20 depends on the shape of the resin composition pattern 20. However, from the standpoint of reliably preventing air bubbles from becoming mixed in the resin when filling the resin between the base 2 and the protective part 3, it is preferred to make the thickness of the resin composition pattern 20 at the center region of the coating face 3a of the protective part 3 thicker than the thickness of the resin composition pattern at the peripheral region.

The resin composition pattern 20B illustrated in FIG. 4 is formed from a plurality of patterns arranged at a given interval on the coating face 3a of the protective part 3.

Specifically, similar to the resin composition pattern 20 illustrated in FIG. 3, the resin composition pattern 20B illustrated in FIG. 4 also has a shape formed by linking the letter Y together. However, the arm portion patterns 22a to 22d extending toward each of the corners of the protective part 3 from the center portion are shorter than the arm portion patterns 22a to 22d illustrated in FIG. 3.

Furthermore, circular resin composition patterns 24a, 24b, 24c, and 24d are respectively provided between the ends 23a to 23d of the arm portion patterns and each of the corners of the coating face 3a of the protective part 3. These circular resin composition patterns 24a to 24d are arranged on the above-described respective reference lines 4a to 4d of the respective corner regions of the coating face 3a of the protective part 3.

The examples illustrated in FIGS. 5 and 6 correspond to modified examples of the resin composition pattern 20B illustrated in FIG. 4.

The resin composition pattern 20C illustrated in FIG. 5 has a rectangular pattern, which is roughly a similar shape to the protective part 3, as the center pattern 21 positioned in the center region of the coating face 3a of the protective part 3, and circular resin composition patterns 24a to 24d between the four corners of the center pattern 21 and each of the corners of the coating face 3a of the protective part 3, which are separated from the center pattern 21, as corner patterns.

The resin composition pattern 20D illustrated in FIG. 6 has a circular pattern as the center pattern 21 positioned in the center region of the coating face 3a of the protective part 3, and circular resin composition patterns 24a to 24d between the center of that circular pattern and each of the corners of the coating face 3a of the protective part 3, which are separated from the circular pattern, as corner patterns.

FIG. 7 illustrates examples of the pattern arranged on both the protective part 3 and the base 2 when the resin composition pattern is formed from a plurality of patterns arranged at an interval.

Figure 7A:
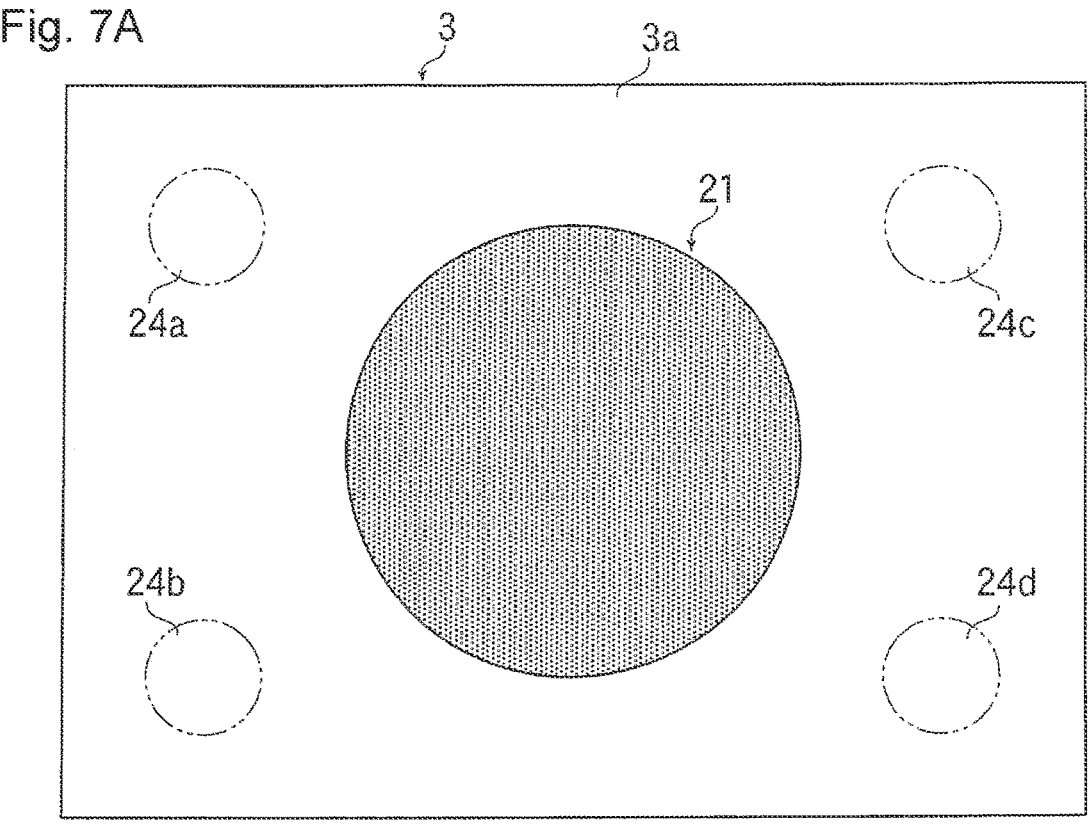
FIGS. 7(a) and 7(b) are diagrams schematically illustrating yet another example of a resin composition pattern according to the present invention.
Figure 7B:
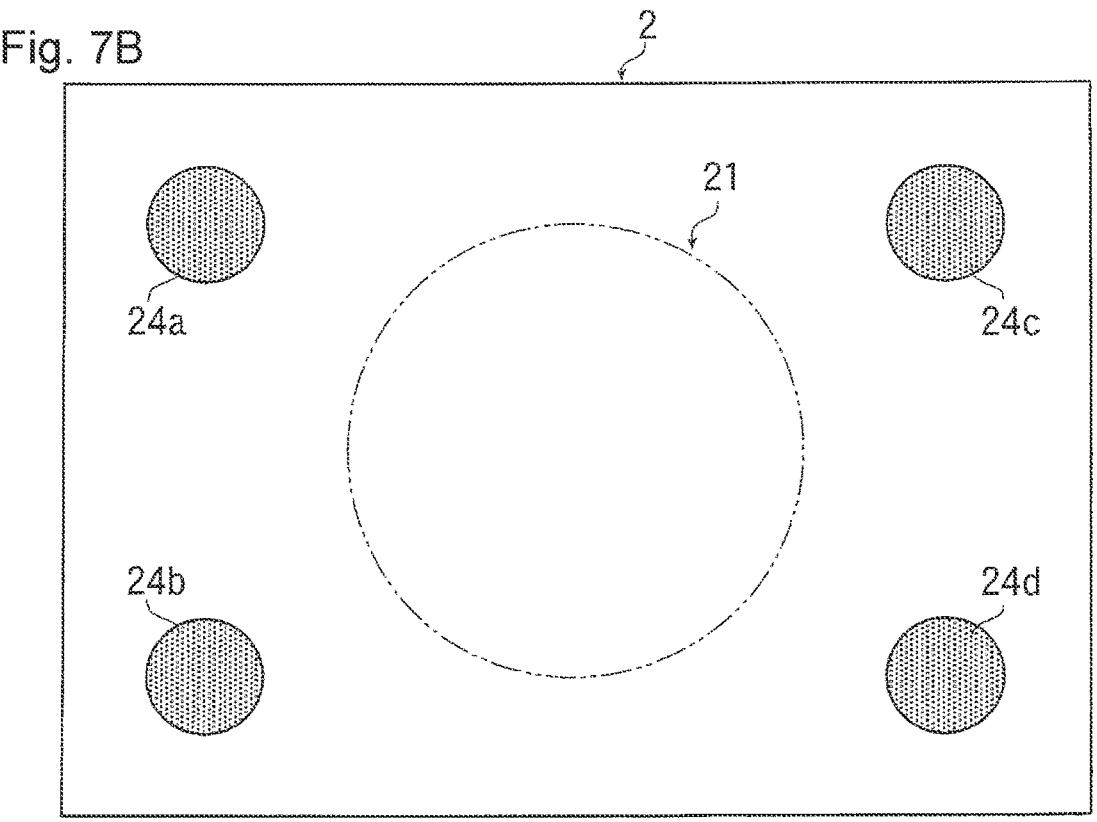

More specifically, FIG. 7(a) has the circular center pattern 21 of the resin composition pattern 20D of FIG. 6 arranged in the center region of the protective part 3. FIG. 7(b) has the circular resin composition patterns 24a to 24d of the same resin composition pattern 20D arranged in the corner regions of the base 2.

In this case, the circular resin composition patterns 24a to 24d can also be arranged at the corner regions of the protective part 3 and the center pattern 21 at the center region of the base 2. However, from the standpoint of preventing air bubbles from becoming mixed in, it is preferred to arrange the center pattern 21 on the protective part 3 and the circular resin composition patterns 24a to 24d on the base 2.

In any of the above-described examples, the curable resin composition 11 can rapidly and completely wetly spread between the base 2 and the protective part 3 in a uniform thickness, and air bubbles can be prevented from becoming mixed in the curable resin composition 11.

Especially, by forming the curable resin composition 11 as the center pattern 21, when the curable resin composition 11 wetly spreads between the base 2 and the protective part 3, it is more difficult for the curable resin composition 11 to protrude from the edges of the base 2 and the protective part 3. Furthermore, by forming the curable resin composition 11 as the corner patterns (arm portion patterns 22a to 22d, circular resin composition patterns 24a to 24d), the curable resin composition 11 can be wetly spread along the edges of the base 2 and the protective part 3.

Moreover, for example, as illustrated in FIGS. 4 to 7, when the resin composition pattern is formed from a plurality of patterns arranged at a given interval, the curable resin composition 11 can be arranged and filled in an optimum state at the respective regions of the base 2 and protective part 3 based on the state of a device, such as the liquid crystal display panel 8, the overall shape and the like.

In addition, for example, as illustrated in FIGS. 7(a) and 7(b), by arranging the center pattern 21 of the resin composition pattern 20D on the protective part 3, and the circular resin composition patterns 24a to 24d thereof, which are corner patterns, on the base 2, these patterns can be formed by separate steps from each other. This allows the production steps to be speeded up even further.

In the present invention, the shape, thickness and the like of the resin composition pattern are not limited to the examples described above. These may be appropriately changed according to the shape and the like of the panel of the image display apparatus 1.

Furthermore, the resin composition pattern may also be formed by a printing method.

As the curable resin composition 11 for forming the resin composition pattern, a curable resin composition is used which is prepared such that the cured resin of that resin composition has a storage modulus (25° C.) of $1 \times 10^7$ Pa or less, and preferably of $1 \times 10^3$ Pa to $1 \times 10^6$ Pa, a refractive index of preferably of 1.45 or more to 1.55 or less, and more preferably of 1.51 or more to 1.52 or less, and a transmittance of 90% or higher in the visible region when formed into a 100 µm-thick layer.

Typically, even when the main resin component forming the curable resin composition is the same, if an additionally-added resin component or monomer component is different, the cured resin formed by curing such curable resin composition may have a storage modulus (25° C.) that exceeds $1 \times 10^7$ Pa. A resin composition that forms such a cured resin is not used as the curable resin composition 11.

The curable resin composition 11 is prepared so as to have a curing shrinkage ratio of 5.0% or less, preferably 4.5% or less, more preferably 4.0% or less, and still more preferably 0 to 2%. Consequently, the internal stress that builds up in the cured resin during curing of the curable resin composition 11 can be reduced, and the distortion at the interface between the cured resin layer 14 and the liquid crystal display panel 8 or the protective part 3 can be prevented. Thus, by arranging the curable resin composition 11 between the liquid crystal display panel 8 and the protective part 3 and then curing the curable resin composition 11, the amount of light scattered at the interface between the cured resin layer 14 and the liquid crystal display panel 8 or the protective part 3 can be reduced. As a result, the luminance and the visibility of the display image can be improved.

The magnitude of the internal stress that builds up in the cured resin during curing of the resin composition can be evaluated by dropping the resin composition onto a flat plate, curing the dropped resin composition, and measuring the average surface roughness of the resultant cured resin. In practice, the distortion generated at the interface between the liquid crystal display panel 8 or the protective part 3 and the cured resin arranged in between can be ignored if, for example, a cured resin obtained by dropping 2 mg of the resin composition onto a glass plate or an acrylic plate and curing by UV irradiation to a 90% or higher cure ratio has an average surface roughness of 6.0 nm or less. With the curable resin composition 11 used in the present embodiment, this average surface roughness can be kept at 6.0 nm or less, preferably at 5.0 or less, and more preferably in the range of 1 to 3 nm. Therefore, in practice, the distortion generated at the interface of the cured resin can be ignored.

Preferred examples of the glass plate which may be used include the glass plate which sandwiches the liquid crystals of a liquid crystal cell, or the glass plate used as the protective plate for a liquid crystal cell. Furthermore, preferred examples of an acrylic plate which may be used include the acrylic plate used as the protective plate for a liquid crystal cell. These glass plates or acrylic plates usually have an average surface roughness of 1.0 nm or less.

In the present invention, the viscosity of the curable resin composition 11 is not especially limited. However, from the perspective of wet spreading rate and tendency not to protrude, the curable resin composition 11 preferably has a viscosity (25° C., cone-plate type rotary viscometer, cone-plate taper angle C35/2°, 10 rpm) of 1,000 mPa·s to 5,000 mPa·s, and more preferably 2,000 mPa·s to 3,000 mPa·s.

Specific examples which may be preferably used include resin compositions containing at least one kind of polymer, such as a polyurethane acrylate, a polyisoprene acrylate or an ester thereof, a hydrogenated terpene resin, and a butadiene polymer; at least one kind of acrylate monomer, such as isobornyl acrylate, dicyclopentenyloxyethyl methacrylate and 2-hydroxybutyl methacrylate; and at least one kind of photopolymerization initiator, such as 1-hydroxy-cyclohexyl-phenyl-ketone. Other additives, such as a sensitizing agent, a plasticizer, transparent particles and the like, may also be added within the scope of the object of the present invention.

Here, as the photopolymerization initiator, 1-hydroxy-cyclohexyl-phenyl-ketone (trade name: Iragacure 184, manufactured by Ciba Specialty Chemicals Inc.) may be preferably used.

The protective part 3 can have a UV-region cutting function to protect the display part against ultraviolet rays. In such a case, as the photopolymerization initiator, it is preferred to use a photopolymerization initiator that can cure even in the visible region (for example, trade name: Speed-Cure TPO, manufactured by Nihon SiberHegner KK).

In the embodiment illustrated in FIG. 1, a pattern of the curable resin composition 11 is coated on a protective part, and then, as illustrated in FIG. 1(b), the top and bottom of the protective part 3 are inverted so that the face provided with the curable resin composition 11 pattern faces perpendicularly down, and the protective part 3 is arranged facing up towards the base 2. Consequently, the surface of the coated curable resin composition 11 is less susceptible to being influenced by the surface shape of the coating face 3a of the protective part 3. Furthermore, the surface of the pattern of the resin composition 11 is smoother due to the combined forces of gravity and resin surface tension. Therefore, the thickness of the resin filled between the base 2 and the protective part 3 can be made more uniform, and air bubbles can be reliably prevented from becoming mixed in the curable resin composition 11.

Next, the protective part 3 is lowered in a horizontal state by a positioning and hoisting mechanism and positioning means (not-illustrated) to fix the protective part 3 at a given position without the use of a spacer for determining an interval between the base 2 and the protective part 3. The curable resin composition 11 coated on the protective part 3 is brought into contact with the surface of the base 2 to fill the curable resin composition 11 in the gap between the base 2 and the protective part 3.

As illustrated in FIG. 1(c), UV-rays 33 are then irradiated via the light-transmitting member 4 on a resin composition filled portion 13 corresponding to the image display region.

The irradiation direction of the UV-rays 33 is not especially limited. However, from the standpoint of achieving more uniform curing of the curable resin composition 11 on the image display region, the direction orthogonal to the surface of the light-transmitting member 4 is preferred.

As illustrated in FIG. 1(c) and in FIG. 2, UV-rays 32 may also be simultaneously directly irradiated from the outward side direction of the bonding face 5a of the shielding part 5 on a resin composition filled portion 12 between the shielding part 5 and the base 2, using a UV irradiation apparatus 31 having a fine irradiation part 30 formed from an optical fiber, for example.

The irradiation direction of the UV-rays 32 is not especially limited, and may be from 0° or more to less than 90° with respect to the horizontal direction. However, from the standpoint of achieving more uniform curing of the curable resin composition 11 on the forming region of the shielding part 5, it is preferred to carry out the irradiation of the UV-rays 32 roughly parallel to the bonding face 6a of the frame 6 of the base 2 and the bonding face 5a of the shielding part 5 of the protective part 3.

By irradiating with such UV-rays 32 and 33, as illustrated in FIG. 1(d), the resin composition filled portions 12 and 13 are cured to form the cured resin layer 14 and obtain the intended image display apparatus 1.

The present invention is not limited to the above-described embodiment, and various changes may be carried out.

For example, the irradiation of the UV-rays 33 on the curable resin composition 11 corresponding to the image display region and the irradiation of the UV-rays 32 on the curable resin composition 11 corresponding to the shielding part may be carried out simultaneously, or in separate steps.

Furthermore, the present invention may be applied not only in the above-described liquid crystal display apparatus, but also in various panel displays, such as an organic EL, a plasma display apparatus and the like.

EXAMPLES

The present invention will now be described in more detail using the following examples and comparative examples. However, the present invention is not limited to these examples and comparative examples.

Coating Solution Preparation

Example Resin 1

The resin composition of Example 1 was prepared by kneading in a kneader 50 parts by weight of polyurethane acrylate (trade name: UV-3000B, manufactured by Nippon Synthetic Chemical Industry Co., Ltd.), 30 parts by weight of isobornyl acrylate (trade name: IBXA, manufactured by Osaka Organic Chemical Industry Ltd.), 3 parts by weight of a photopolymerization initiator (trade name: Irgacure 184, manufactured by Ciba Specialty Chemicals Inc.), and 1 part by weight of a photopolymerization initiator (trade name: SpeedCure TPO, manufactured by Nihon SiberHegner KK).

Example Resin 2

The resin composition of Example 2 was prepared by kneading in a kneader 70 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator, and 0.5 parts by weight of a visible region photopolymerization initiator.

Example Resin 3

The resin composition of Example 3 was prepared by kneading in a kneader 100 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 210 parts by weight of a butadiene polymer, 7 parts by weight of a photopolymerization initiator, and 1.5 parts by weight of a visible region photopolymerization initiator.

Example Resin 4

The resin composition of Example 4 was prepared by kneading in a kneader 70 parts by weight of an ester compound formed from a maleic anhydride adduct of a polyisoprene polymer and 2-hydroxyethyl methacrylate (trade name: UC-203, manufactured by Kuraray Co., Ltd.), 30 parts by weight of dicyclopentenyl oxyethyl methacrylate (trade name: FA512M, manufactured by Hitachi Chemical Co., Ltd.), 10 parts by weight of 2-hydroxybutyl methacrylate (trade name: Light Ester HOB, manufactured by Kyoeisha Chemical Co., Ltd.), 30 parts by weight of a hydrogenated terpene resin (trade name: Clearon P-85, manufactured by Yasuhara Chemical Co., Ltd.), 35 parts by weight of a butadiene polymer (trade name: Polyoil 110, manufactured by Zeon Corporation), 5 parts by weight of a photopolymerization initiator (trade name Irgacure 184D, manufactured by Ciba Specialty Chemicals Inc.), and 2 parts by weight of a photopolymerization initiator (trade name SpeedCure TPO, manufactured by Nihon SiberHegner KK).

Comparative Example Resin 1

The resin composition of Comparative Example 1 was prepared by kneading in a kneader 50 parts by weight of polybutadiene acrylate (trade name: TE-2000, manufactured by Nippon Soda Co., Ltd.), 20 parts by weight of hydroxyethyl methacrylate (trade name: Light Ester HO, manufactured by Kyoeisha Chemical Co., Ltd.), 3 parts by weight of a photopolymerization initiator (trade name: Irgacure 184, manufactured by Ciba Specialty Chemicals Inc.), and 1 part by weight of a photopolymerization initiator (trade name: SpeedCure TPO, manufactured by Nihon SiberHegner KK).

Comparative Example Resin 2

The resin composition of Comparative Example 3 was prepared by kneading in a kneader 50 parts by weight of polyurethane acrylate (trade name: UV-3000B, manufactured by Nippon Synthetic Chemical Industry Co., Ltd.), 30 parts by weight of tricyclodecane dimethanol acrylate (trade name: NK Ester LC2, manufactured by Shin-nakamura Chemical Co., Ltd.), 3 parts by weight of a photopolymerization initiator (trade name: Irgacure 184, manufactured by Ciba Specialty Chemicals Inc.), and 1 part by weight of a photopolymerization initiator (trade name: SpeedCure TPO, manufactured by Nihon SiberHegner KK).

Comparative Example Resin 3

The resin composition of Comparative Example 3 was prepared by kneading in a kneader 50 parts by weight of polybutadiene acrylate (trade name: TE-2000, manufactured by Nippon Soda Co., Ltd.), 20 parts by weight of isobornyl acrylate (trade name: IBXA, manufactured by Osaka Organic Chemical Industry Ltd.), 3 parts by weight of a photopolymerization initiator (trade name: Irgacure 184, manufactured by Ciba Specialty Chemicals Inc.), and 1 part by weight of a photopolymerization initiator (trade name: SpeedCure TPO, manufactured by Nihon SiberHegner KK).
Evaluation 1

The light transmittance, storage modulus, curing shrinkage ratio, and surface roughness of Example Resins 1 to 4 and Comparative Example Resins 1 to 3 were measured as described below. These results are shown in Table 1.
[Light Transmittance]

Each of the resin compositions was dropped onto a 100 μm-thick white glass plate to a given thickness. The plates were conveyed on a UV-conveyor in a UV irradiation apparatus to obtain cured resin samples.

The transmittance (%) of each sample (cured resin thickness of 100 μm) in the visible region was measured by a UV-Visible spectrophotometer (V-560, manufactured by JASCO Corporation).
[Storage Modulus]

Samples were produced in the same manner as the light transmittance samples. The storage modulus (Pa) of each sample was measured using a viscoelastometer (DMS6100, manufactured by Seiko Instruments Inc.) (measurement frequency of 1 Hz, 25° C.).
[Curing Shrinkage Ratio]

The curing shrinkage ratio (%) was calculated by the following equation based on the difference in the specific gravities between the uncured resin solution and the cured solid product, as measured by an electronic densimeter (SD-120L, manufactured by Mirage).

Curing shrinkage ratio (%)=(Cured product specific gravity−Resin solution specific gravity)/Cured product specific gravity×100   [Equation 1]

[Surface Roughness Measurement]

2 mg of each resin composition was dropped onto a glass plate for a liquid crystal cell. The distortion (Ra: average surface roughness) in a given region (2.93 mm×2.20 mm) of a glass plate surface formed by the internal stress generated during the curing reaction from the UV irradiation was measured using a three-dimensional non-contact surface roughness meter manufactured by Zygo Corporation.

TABLE 1

Properties and Evaluation Results of Example Resins and Comparative Example Resins

|  | Transmittance (%) | Storage Modulus (Pa) | Curing Shrinkage Ratio (%) | Ra: Average Surface Roughness (nm) |
|---|---|---|---|---|
| Example Resin 1 | 90 or more | $1 \times 10^6$ | 4.5 | 5.5 |
| Example Resin 2 | 90 or more | $1 \times 10^4$ | 1.8 | 2.7 |
| Example Resin 3 | 90 or more | $4 \times 10^3$ | 1.0 | 1.5 |
| Example Resin 4 | 90 or more | $4 \times 10^5$ | 3.8 | 5.0 |
| Comparative Example Resin 1 | 90 or more | $2 \times 10^7$ | 5.6 | 12.4 |
| Comparative Example Resin 2 | 90 or more | $3 \times 10^8$ | 4.3 | 36.5 |
| Comparative Example Resin 3 | 90 or more | $5 \times 10^8$ | 5.6 | 64.2 |

As can be seen from Table 1, regarding transmittance, good results without any problems were obtained for both the example resins and the comparative example resins.

However, Example Resins 1 to 4 had a storage modulus of $4 \times 10^3$ to $1 \times 10^6$ Pa and a curing shrinkage ratio of 1.0 to 4.5%. Consequently, the average surface roughness Ra was from 1.5 to 5.5 nm, and there was hardly any distortion, meaning that good results were obtained.

In comparison, average surface roughness Ra was significantly large in Comparative Example Resin 1 (Ra=12.4 nm), Comparative Example Resin 2 (Ra=36.5 nm), and Comparative Example Resin 3 (Ra=64.2 nm), from which it can be understood that the distortion at the interface between the resin and the glass plate was caused by the internal stress generated during curing of the resin.

Evaluation 2

Using the resin composition of Example Resins 1 to 4, the resin composition wet spreading time and difference in thickness were evaluated in the following manner for the example pattern illustrated in FIG. 1 and the comparative example pattern illustrated in FIG. 8. These results are shown in Table 2.

Example Pattern

Using the resin composition of Example Resin 1, the above-described resin composition pattern 21 illustrated in FIG. 4 and circular resin composition patterns 24a to 24d were formed on a coating face 3a of the protective part 3 side of the image display apparatus of FIG. 1. The protective part 3 was then inverted and arranged parallel with and facing in close proximity to the liquid crystal display panel 8 of the base 2 side to make the resin composition wetly spread between the base 2 and the protective part 3.

The resin compositions of Example Resins 2 to 4 were made to wetly spread between the base 2 and the protective part 3 in the same manner as the resin composition of Example Resin 1.

Comparative Example Pattern

The resin composition of Comparative Example Resin 1 was made to wetly spread between the base 2 and the protective part 3 in the same manner as described above, except that the elliptical pattern 50 illustrated in FIG. 8 was formed on a middle portion of the coating face 3a of the protective part 3.

[Measurement of Unevenness in Resin Thickness]

The wet spreading time and unevenness in resin thickness were calculated for the resin compositions filled between the base 2 and the protective part 3.

The unevenness in resin thickness was determined by measuring the total thickness of the image display apparatus (FIG. 1(d)) on which the base 2 and the protective part 3 were bonded with a film thickness meter (μMate, manufactured by Sony Corporation) at a total of five points of the bonded region, the center and the four corners, and determining the ratio (%) of deviation with respect to a standard thickness (100 μm) for each of the measured values. The unevenness in resin thickness was then calculated from the variation ($\sigma^2$) among the deviation ratios.

TABLE 2

|  | Wet Spreading Time (minute comparison) | Unevenness in Resin Thickness ($\sigma$) |
|---|---|---|
| Example Pattern (Example Resins 1 to 4) | 0.1 | 5% or less |
| Comparative Example Pattern (Comparative Example Resin 1) | 1 | 30% |

As can be seen from Table 2, regarding the wet spreading time of the resin compositions, when the example pattern was used, for all of Example Resins 1 to 4, the filling of the resin composition could be carried out in 1/10 of the wet spreading time of that of the comparative example pattern.

Furthermore, regarding unevenness in resin thickness, the example pattern obtained better results than the comparative example pattern (30%).

In this case, for Example Resin 1, the unevenness in resin thickness was 5%, and for Example Resins 2 to 4, the unevenness in resin thickness was less than 5%.

Based on these results, it can be understood that according to the present invention a resin composition can be filled between the base 2 and the protective part 3 of the image display apparatus in a uniform thickness and in a short time.

INDUSTRIAL APPLICABILITY

The present invention is useful in the production of an image display apparatus such as a liquid crystal display apparatus.

The invention claimed is:

1. A method for producing an image display apparatus comprising:

coating a curable resin composition onto a base having an image display part or onto a light transmitting protective part arranged on the image display part, wherein the curable resin composition has a curing shrinkage ratio of 5% or less, consists essentially of polymer(s), monomer(s) and photopolymerization initiator(s), and comprises polyurethane acrylate as a polymer, isobornyl acrylate as a monomer and a photopolymerization initiator that cures with light in the visible region, and wherein the curable resin composition coated onto the base or the protective part has a pattern with a prescribed shape;

arranging the base and the protective part to face each other in close proximity, wherein the curable resin composition is made to spread between the base and the protective part due to the base and the protective part being arranged facing each other in close proximity; and then forming a cured resin layer between the base and the protective part by curing the curable resin composition, in the image display apparatus, wherein the cured resin layer has a storage modulus of $1\times10^3$ Pa or more to $1\times10^6$ or less at 25° C. a refractive index of 1.45 or more to 1.55 or less, and a light transmittance in a visible region of 90% or more, when formed into a 100 μm thick layer, wherein the cured resin layer is a single continuous layer across and coating the whole of the opposing faces of the base and the protective part, and the cured resin layer has an average surface roughness of 5.5 nm or less when the curable resin composition is applied to the protective part having a form of a flat plate formed from an acrylic resin or an optical glass, and cured by UV-radiation to a 90% or higher cure ratio, wherein the pattern of the curable resin composition is formed from a center pattern positioned in a center portion of a coating face of the base or the protective part, and a corner pattern which is positioned closer to a corner of the coating face than the center portion and which is continuous with or separated from the center pattern, and is formed by coating the curable resin composition so that when the base and the protective part are arranged facing each other in close proximity, the curable resin composition spreads across the whole of the opposing faces of the base and the protective part, and forms a single continuous layer across and coating the whole of the opposing faces of the base and the protective part without protruding from edges of the base and the protective part.

2. The production method according to claim 1, wherein a circular resin composition pattern that is separate from the center pattern and the corner pattern is formed between an end of the corner pattern and each of the corner of the coating face of the base or the protective part.

3. The production method according to claim 1, wherein the curable resin composition is coated on both the base and the protective part.

4. The production method according to claim 1, wherein the curable resin composition has a curing shrinkage ratio of 4.0% or less.

5. The production method according to claim 1, wherein the cured resin layer has a thickness of 50 to 200 μm.

6. The production method according to claim 1, wherein the image display part is a liquid crystal display panel.

7. The production method according to claim 1, wherein the protective part is formed from an acrylic resin.

8. The production method according to claim 1, wherein the protective part is formed from an optical glass.

9. The production method according to claim 1, wherein the center pattern is formed in a belt-like pattern extending linearly in a direction of a long side of the base or the protective part.

10. The production method according to claim 1, wherein the corner pattern is formed in an arm portion pattern that branches out and extends in four directions from either end of the center pattern, with the arm portion pattern being arranged on a reference line from either end of the center pattern to each corner of a coating face of the base or the protective part.

11. The production method according to claim 1, wherein a thickness of the curable resin composition at the center portion of a coating face of the base or the protective part is thicker than a thickness of the curable resin composition at a corner portion of the coating face of base or the protective part.

12. The production method according to claim 1, wherein a thickness of the curable resin composition tapers downwardly from the center portion of the coating face of the base or the protective part to a periphery of the corner portion of the coating face of base or the protective part.

13. An image display apparatus comprising a base, a cured resin layer and a light-transmitting protective part, wherein the image display apparatus is produced by a production method comprising:

coating a curable resin composition onto the base having an image display part or onto the light-transmitting protective part arranged on the image display part, wherein the curable resin composition has a curing shrinkage ratio of 5% or less, consists essentially of polymer(s), monomer(s) and photopolymerization initiator(s), and comprises polyurethane acrylate as a polymer, isobornyl acrylate as a monomer and a photopolymerization initiator that cures with light in the visible region, and wherein the curable resin composition coated onto the base or the protective part has a pattern with a prescribed shape;

arranging the base and the protective part to face each other in close proximity, wherein the curable resin composition is made to spread between the base and the protective part due to the base and the protective part being arranged facing each other in close proximity; and forming the cured resin layer between the base and the protective part by curing the curable resin composition, wherein the cured resin layer has a storage modulus of $1 \times 10^3$ Pa or more to $1 \times 10^6$ Pa or less at 25° C. a refractive index of 1.45 or more to 1.55 or less, and a light transmittance in a visible region of 90% or more, when formed into a 100 μm thick layer, wherein the cured resin layer is a single continuous layer across and coating the whole of the opposing faces of the base and the protective part, and has an average surface roughness of 5.5 nm or less when the curable resin composition is applied to the protective part having a form of a flat plate formed from an acrylic resin or an optical glass, and cured by UV-radiation to a 90% or higher cure ratio, wherein the pattern of the curable resin composition is formed from a center pattern positioned in a center portion of a coating face of the base or the protective part, and a corner pattern which is positioned closer to a corner of the coating face than the center portion and which is continuous with or separated from the center pattern, and is formed by coating the curable resin composition so that when the base and the protective part are arranged facing each other in close proximity, the curable resin composition spreads across the whole of the opposing faces of the base and the protective part, and forms a single continuous layer across and coating the whole of the opposing faces of the base and the protective part without protruding from edges of the base and the protective part.

* * * * *